US012629941B2

(12) United States Patent
Tamai et al.

(10) Patent No.: US 12,629,941 B2
(45) Date of Patent: May 19, 2026

4
(54) INKJET RECORDING DEVICE

(71) Applicant: KYOCERA CORPORATION, Kyoto (JP)

(72) Inventors: Hiroatsu Tamai, Osaka (JP); Masaaki Maruta, Matsubara (JP); Daisuke Eto, Osaka (JP); Masahiro Higashitani, Osaka (JP); Tomoya Hotani, Kimino-cho (JP)

(73) Assignee: KYOCERA CORPORATION, Kyoto (JP)

( * ) Notice: Subject to any disclaimer, the term of this patent is extended or adjusted under 35 U.S.C. 154(b) by 80 days.

(21) Appl. No.: 18/291,919

(22) PCT Filed: Jul. 11, 2022

(86) PCT No.: PCT/JP2022/027296

§ 371 (c)(1),
(2) Date: Jan. 25, 2024

(87) PCT Pub. No.: WO2023/008166

PCT Pub. Date: Feb. 2, 2023

(65) Prior Publication Data

US 2025/0091350 A1 Mar. 20, 2025

(30) Foreign Application Priority Data

Jul. 29, 2021 (JP) ................................ 2021-124064

(51) Int. Cl.

*B41J 2/165* (2006.01)
*B41J 2/17* (2006.01)
*B41J 2/21* (2006.01)

(52) U.S. Cl.

CPC ....... *B41J 2/16544* (2013.01); *B41J 2/16538* (2013.01); *B41J 2/16541* (2013.01); *B41J 2/1721* (2013.01); *B41J 2/2114* (2013.01); *B41J 2/2117* (2013.01); *B41P 2235/21* (2013.01)

(58) Field of Classification Search

CPC .. B41J 2/16544; B41J 2/16538; B41J 2/1721; B41J 2/2114

See application file for complete search history.

(56) References Cited

U.S. PATENT DOCUMENTS

| | | | | |
|---|---|---|---|---|
| 2001/0012028 | A1 | 8/2001 | Nitta | |
| 2008/0238984 | A1 | 10/2008 | Yahiro | |
| 2016/0046128 | A1 | 2/2016 | Tanda | |
| 2020/0139712 | A1* | 5/2020 | Ueno | B41J 2/16538 |

FOREIGN PATENT DOCUMENTS

| | | | |
|---|---|---|---|
| CN | 105313474 | A | 2/2016 |
| JP | H09-187953 | A | 7/1997 |
| JP | 2005262561 | A | 9/2005 |
| JP | 2008246786 | A | 10/2008 |
| JP | 2016-041505 | A | 3/2016 |

* cited by examiner

*Primary Examiner* — Sharon Polk

(74) *Attorney, Agent, or Firm* — HAUPTMAN HAM, LLP

(57) ABSTRACT

An inkjet recording apparatus includes a processing liquid head ejecting a processing liquid, an ink head ejecting an ink, a processing liquid wiper wiping the processing liquid head, an ink wiper wiping the ink head, and an ink container including a first opening receiving the ink. A movement range of the processing liquid wiper during the wiping is set to a position without a region directly above the first opening.

19 Claims, 29 Drawing Sheets

INKJET RECORDING DEVICE

RELATED APPLICATIONS

The present application is a National Phase of International Application Number PCT/JP2022/027296 filed Jul. 11, 2022, which claims the benefit of priority from Japanese Patent Application No. 2021-124064, filed on Jul. 29, 2021.

TECHNICAL FIELD

The present disclosure relates to an inkjet recording apparatus including a processing liquid head ejecting a processing liquid and an ink head ejecting an ink.

BACKGROUND OF INVENTION

An inkjet recording apparatus such as an inkjet printer includes an ink head ejecting an ink for image formation toward a recording medium and a processing liquid head ejecting a predetermined processing liquid. For example, when the recording medium is a fiber sheet such as a woven fabric or a knitted fabric, or a plastic sheet, application of a pre-processing liquid and the post-processing liquid to the recording medium may be necessary before and after the ink is ejected toward the recording medium, respectively. The pre-processing liquid is, for example, a processing liquid for improving the fixability of the ink to the recording medium and an aggregation property of an ink pigment. The post-processing liquid is, for example, a processing liquid enhancing the fastness of a printed image. In this case, the inkjet recording apparatus includes processing liquid heads each ejecting a respective one of the pre-processing liquid and the post-processing liquid, in addition to the ink head.

In general, the inkjet recording apparatus includes a maintenance area for the ink head and the processing liquid head, in addition to a printing area in which printing processing is performed (for example, Patent Document 1). In the maintenance area, processing for eliminating clogging of nozzles ejecting the ink or the processing liquid and removing dirt and the like on a nozzle array surface of the head is performed. For this processing, a purge operation of ejecting a pressurized liquid from the nozzles, a wiping operation of wiping the nozzle array surface with a wiper including a wiping member such as a blade, and the like are performed.

CITATION LIST

Patent Literature

Patent Document 1: JP 2005-262561 A

SUMMARY

In an aspect of the present disclosure, an inkjet recording apparatus includes a treatment liquid head ejecting treatment liquid, an ink head ejecting an ink, a treatment liquid wiper wiping the treatment liquid head, an ink wiper wiping the ink head, and an ink container with a first opening, the first opening receiving the ink. A movement range of the treatment liquid wiper at the time of wiping is set at a position without a region directly above the first opening. The "position without a region directly above" includes a position where another member is interposed between a partial region of the first opening and the treatment liquid wiper in addition to a position outside of an upper space of the first opening.

Figure 9:
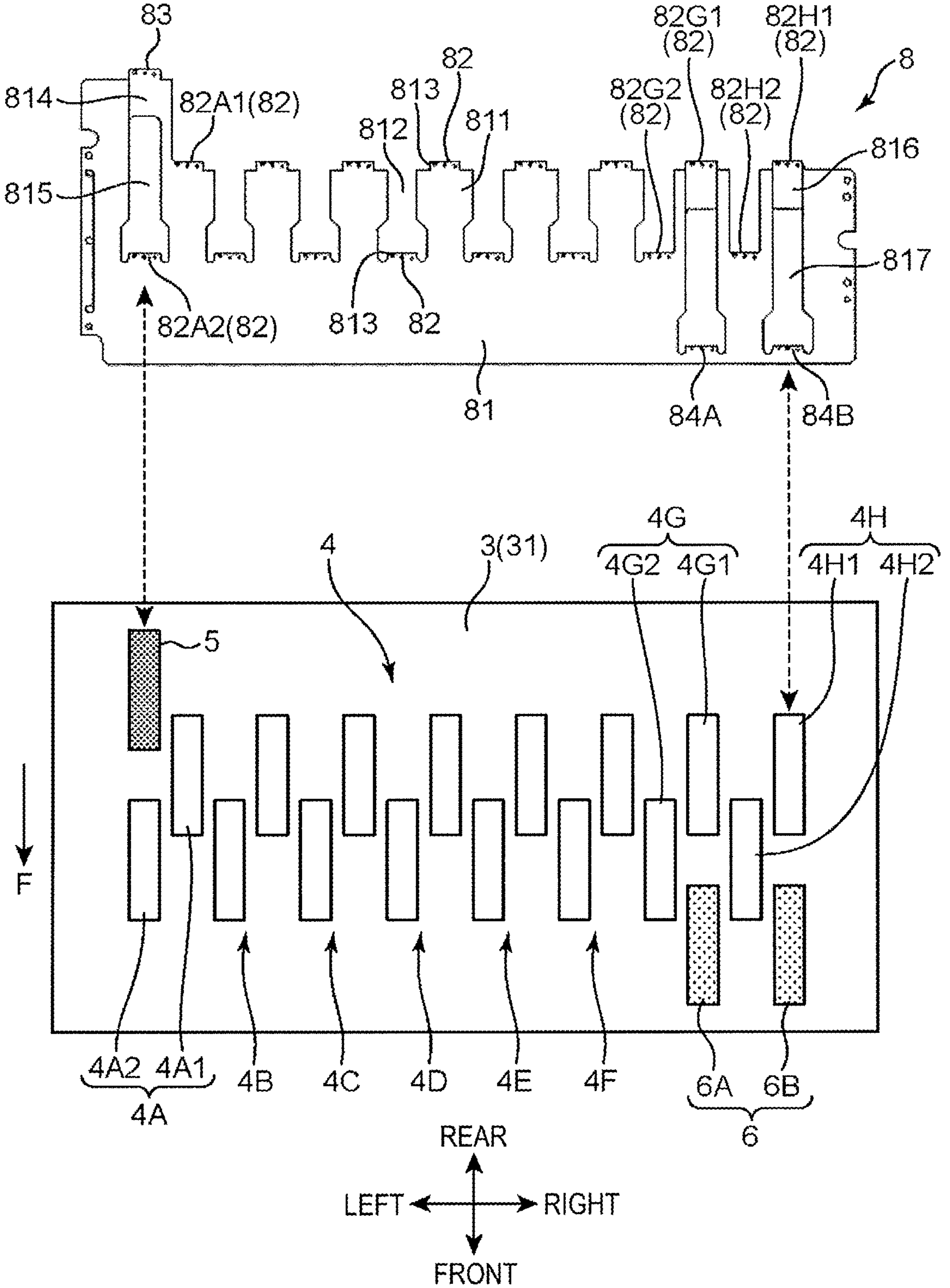

An upper view in FIG. 9 is a plan view of the wiping unit and a lower view in FIG. 9 is a plan view illustrating an arrangement of ink heads mounted on the carriage.

Figure 10:
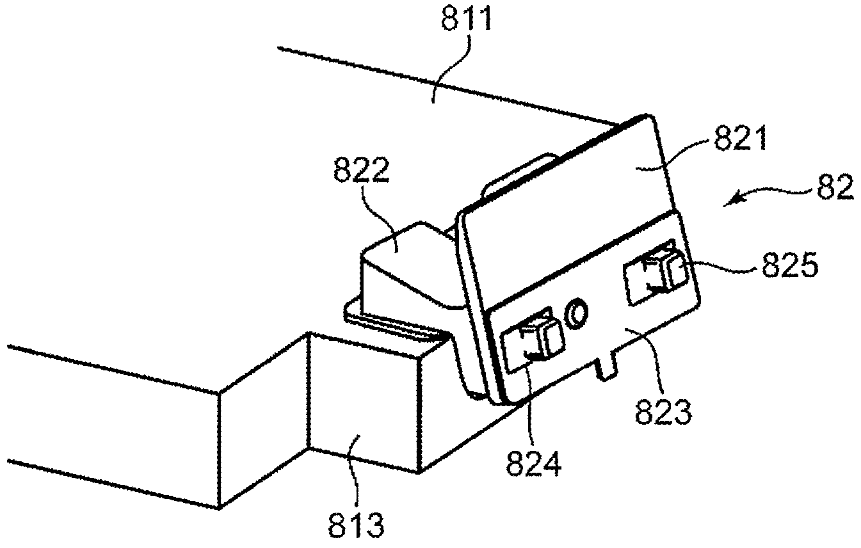

FIG. 10 is a perspective view of one of wipers included in the wiping unit.

Figure 7:
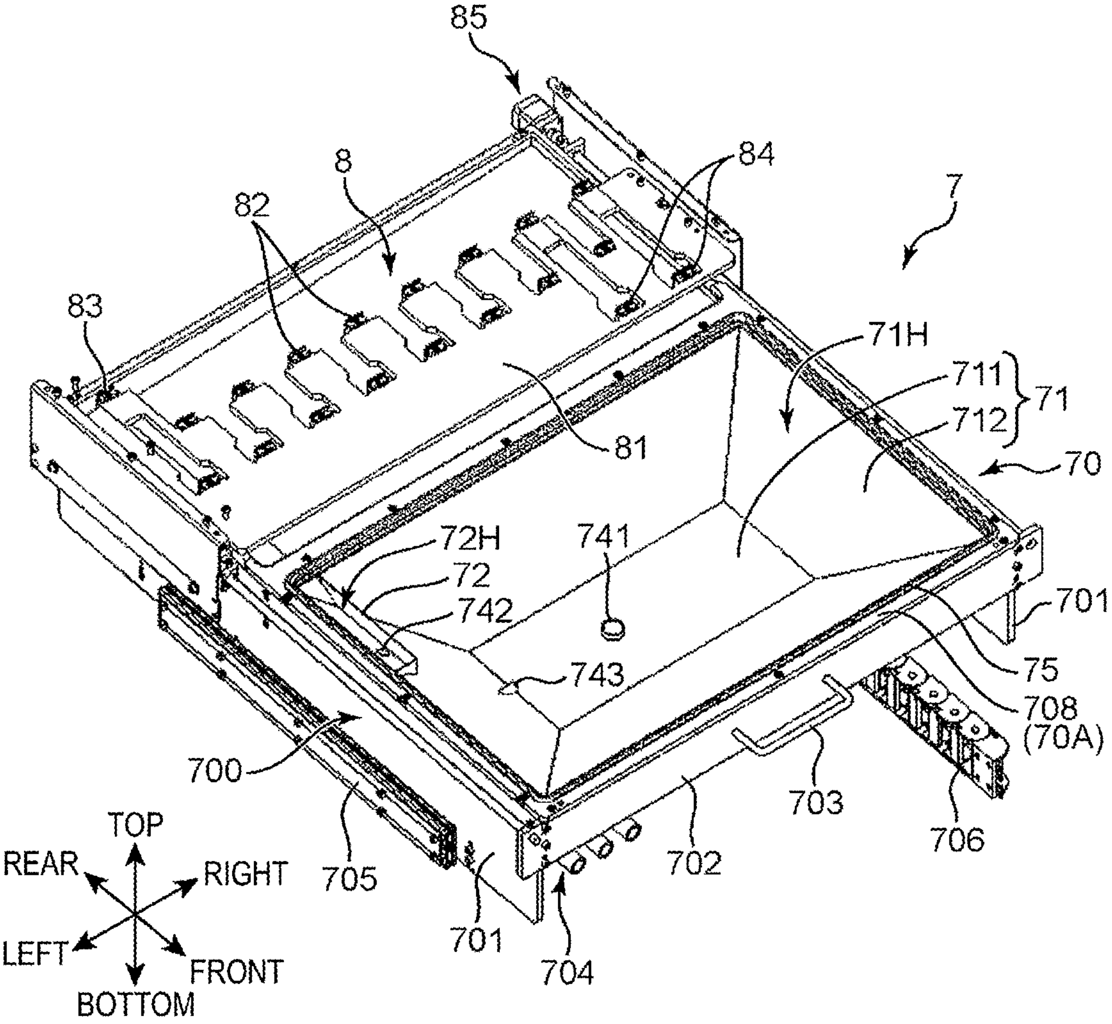
FIG. 7 is a perspective view of a state in which a cleaning unit is removed from the maintenance unit illustrated in FIG. 6.
Figure 11A:
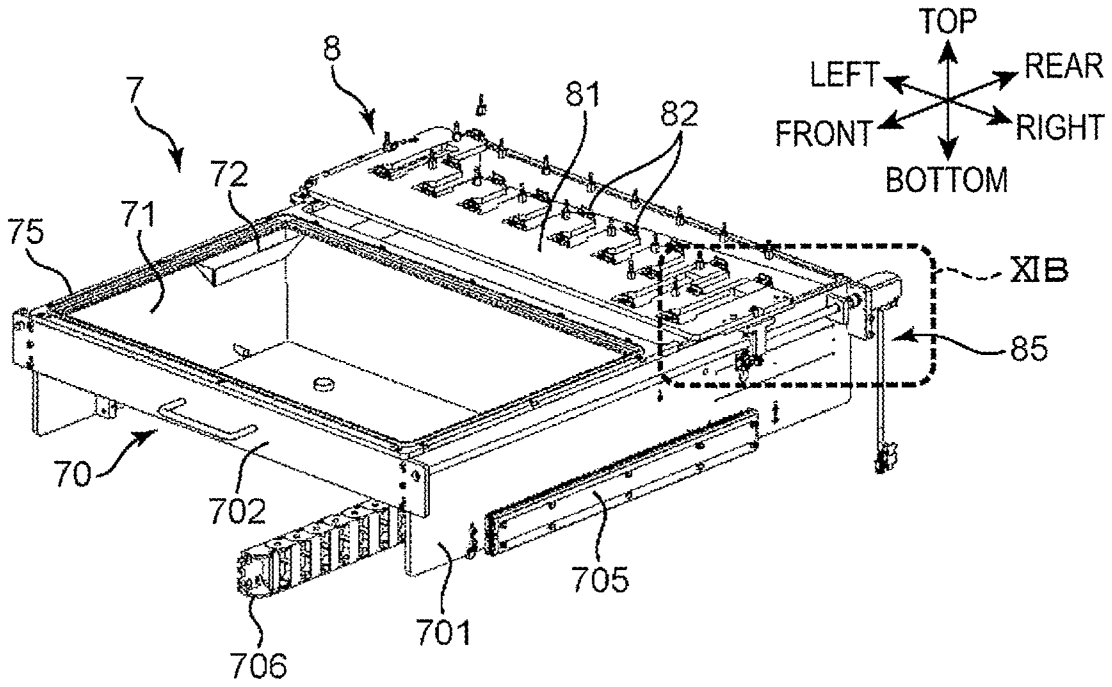

FIG. 11A is a perspective view of the maintenance unit with a perspective direction different from that in FIG. 7.

Figure 11B:
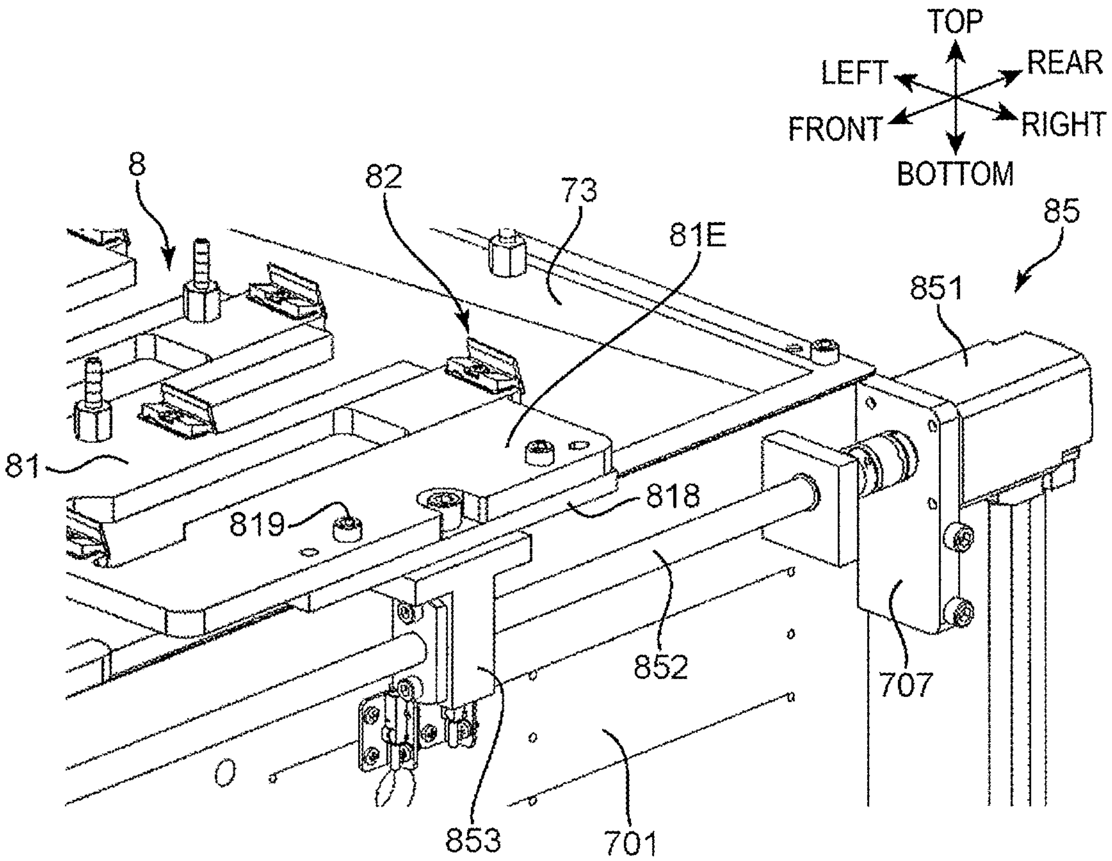

FIG. 11B is an enlarged view of a drive system part of the wiping unit.

Figure 12:
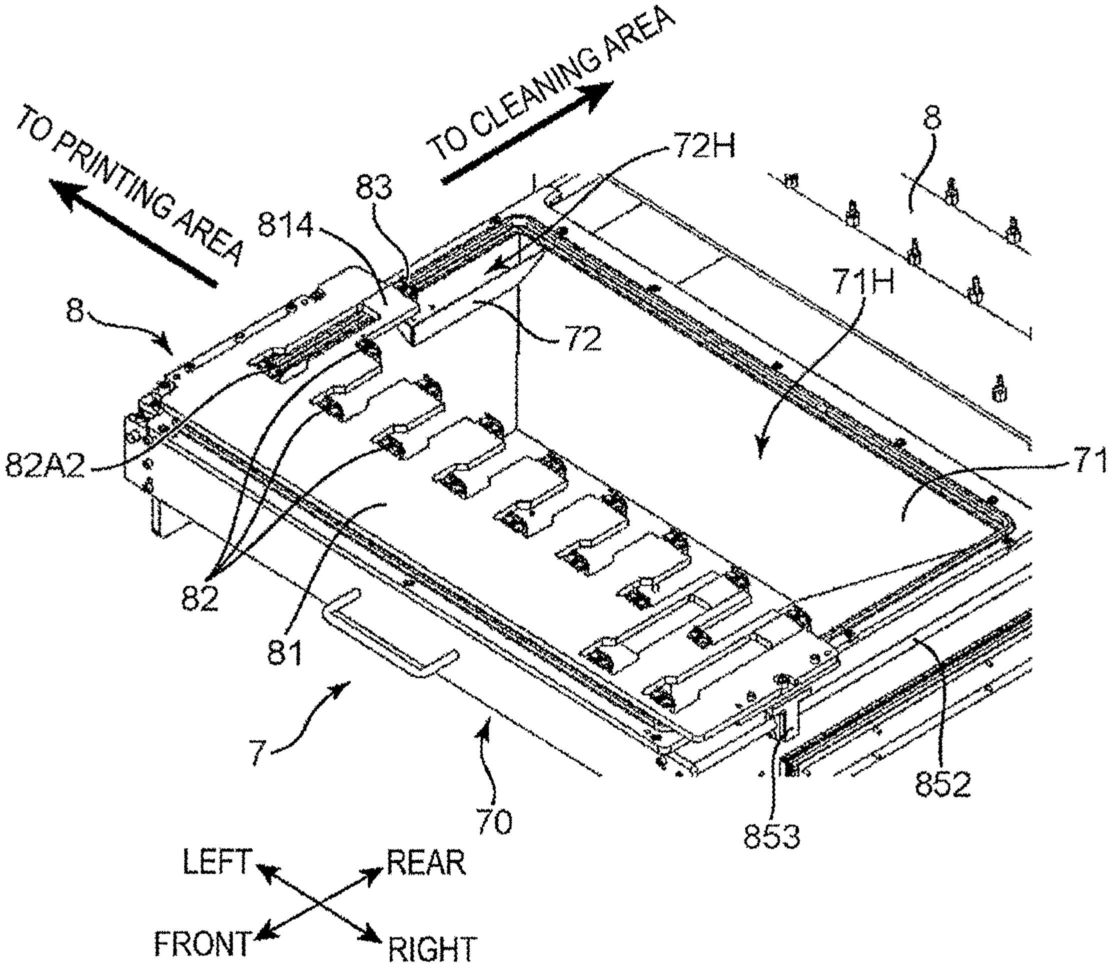

FIG. 12 is a perspective view for explaining a movement direction of the wiping unit.

Figure 13:
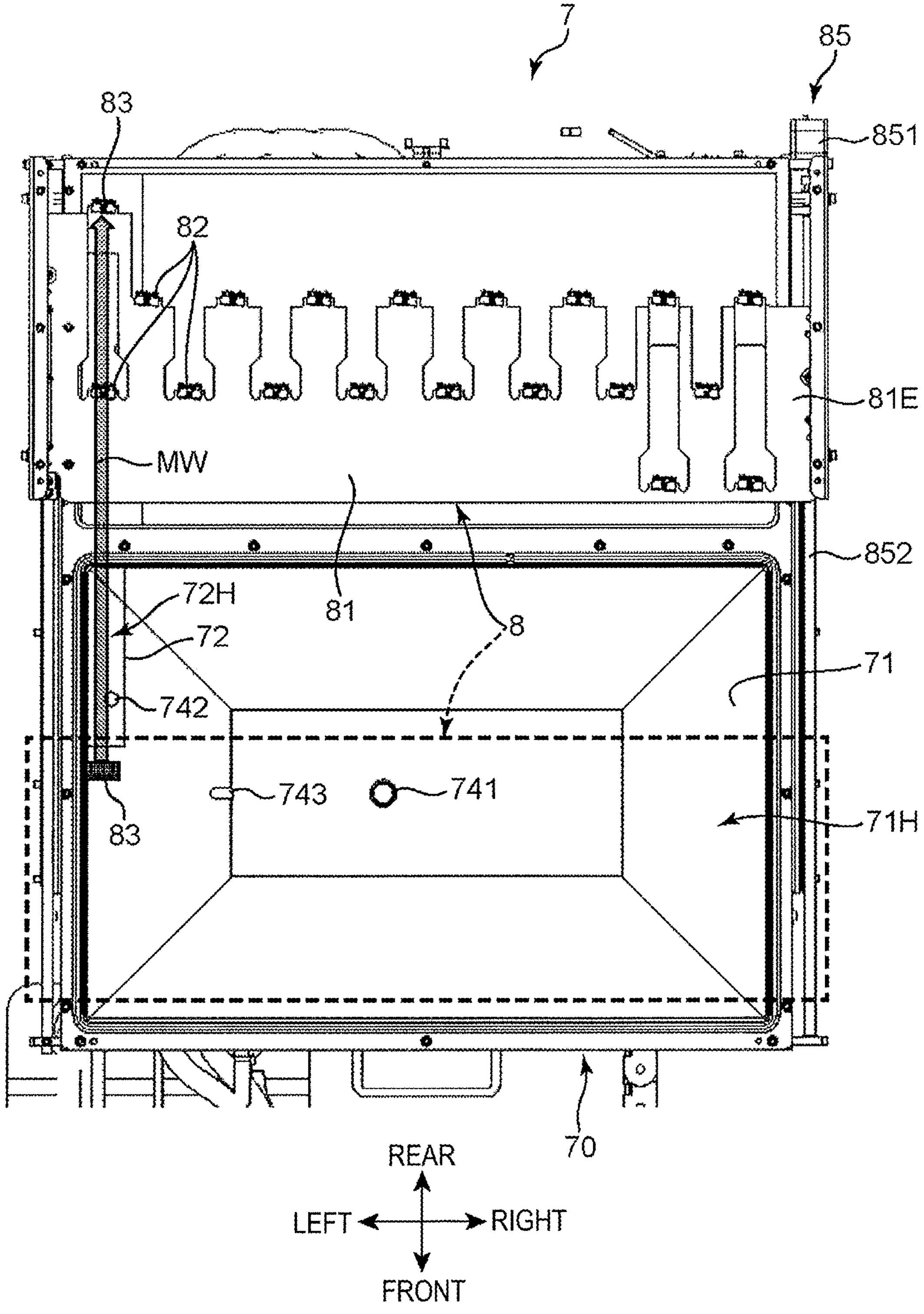

FIG. 13 is a top view of the maintenance unit illustrating a movement path of the wiping unit.

Figure 14A:
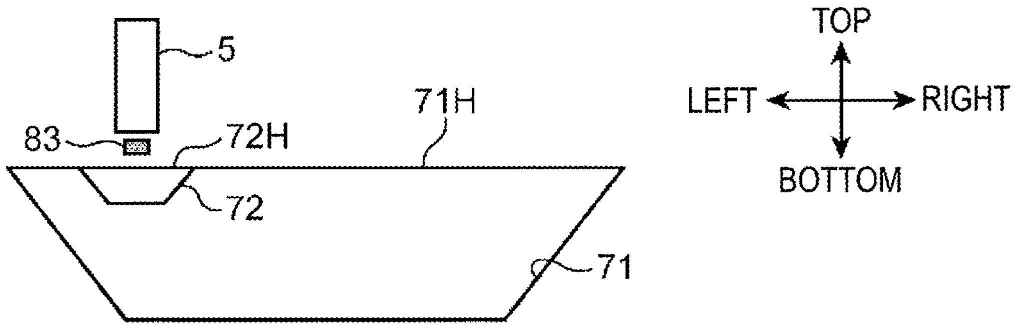

FIG. 14A is a schematic view illustrating an arrangement example of the processing liquid container without a region directly above an opening of an ink container and is a cross-sectional view of the processing liquid container in the left-right direction.

Figure 14B:
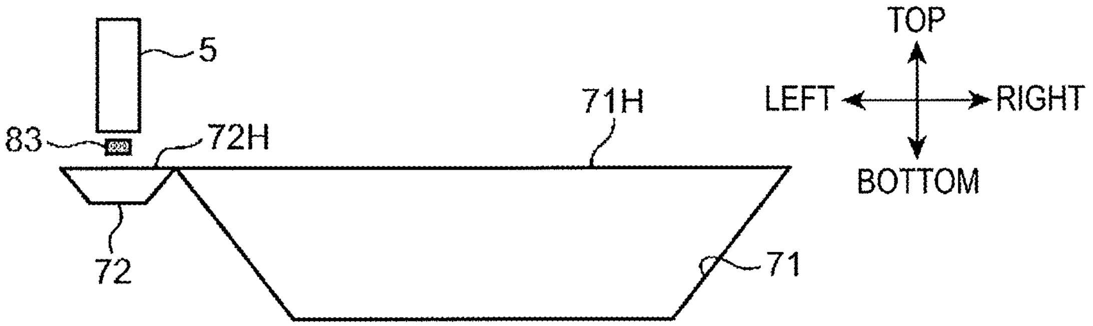

FIG. 14B is a cross-sectional view in the left-right direction also illustrating the arrangement example of the processing liquid container.

Figure 14C:
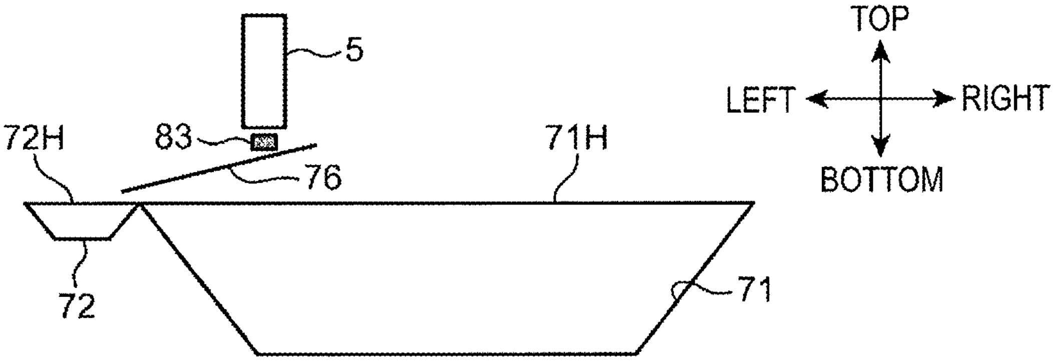

FIG. 14C is a cross-sectional view in the left-right direction also illustrating the arrangement example of the processing liquid container.

Figure 14D:
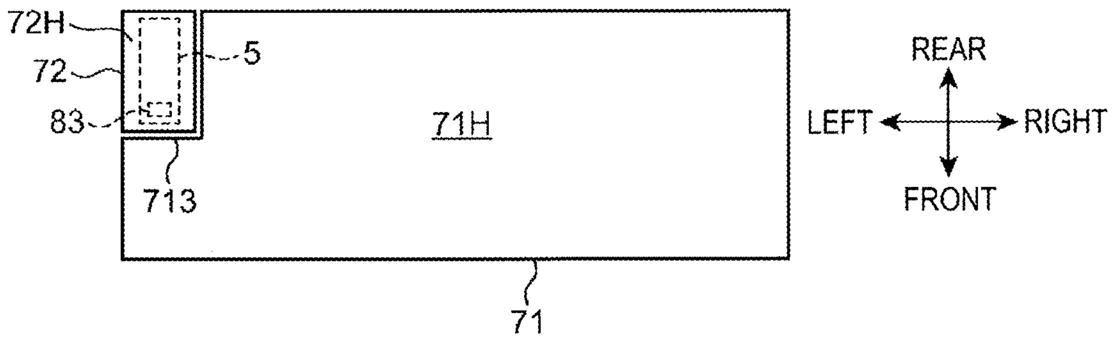

FIG. 14D is a top view also illustrating the arrangement example of the processing liquid container.

Figure 15A:
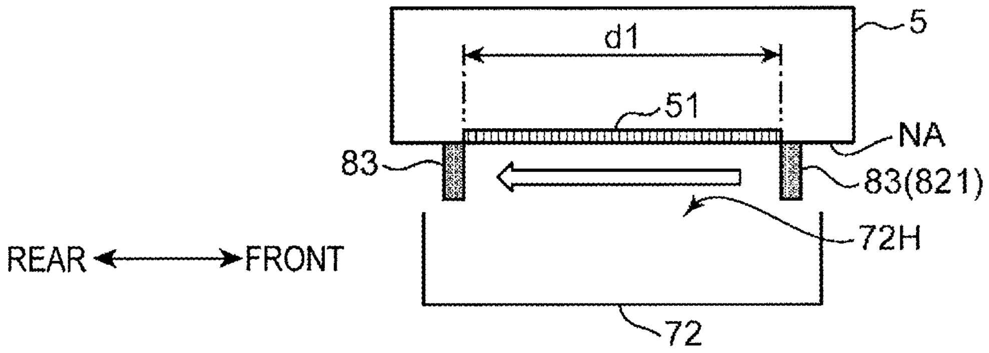

FIG. 15A is a schematic view illustrating a movement range of a processing liquid wiper during wiping.

Figure 15B:
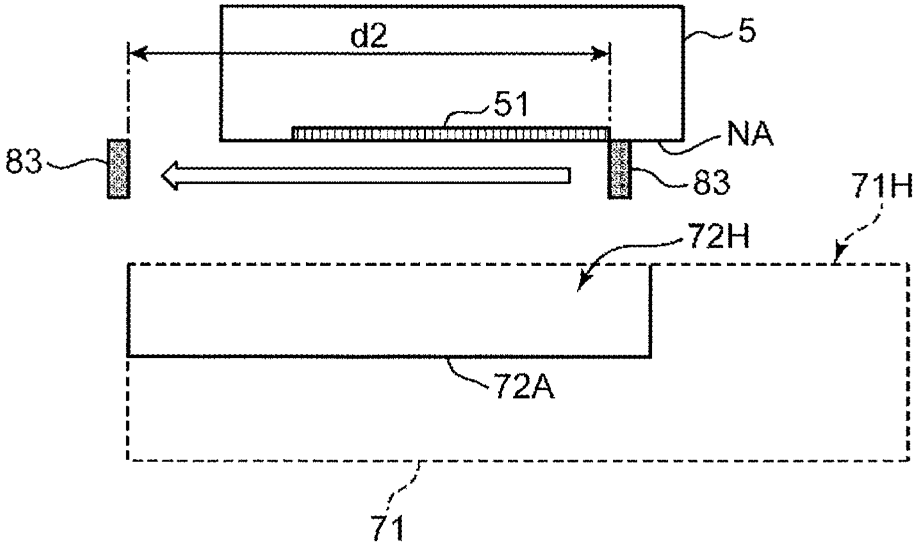

FIG. 15B is a schematic view illustrating a movement range of the processing liquid wiper during wiping.

Figure 15C:
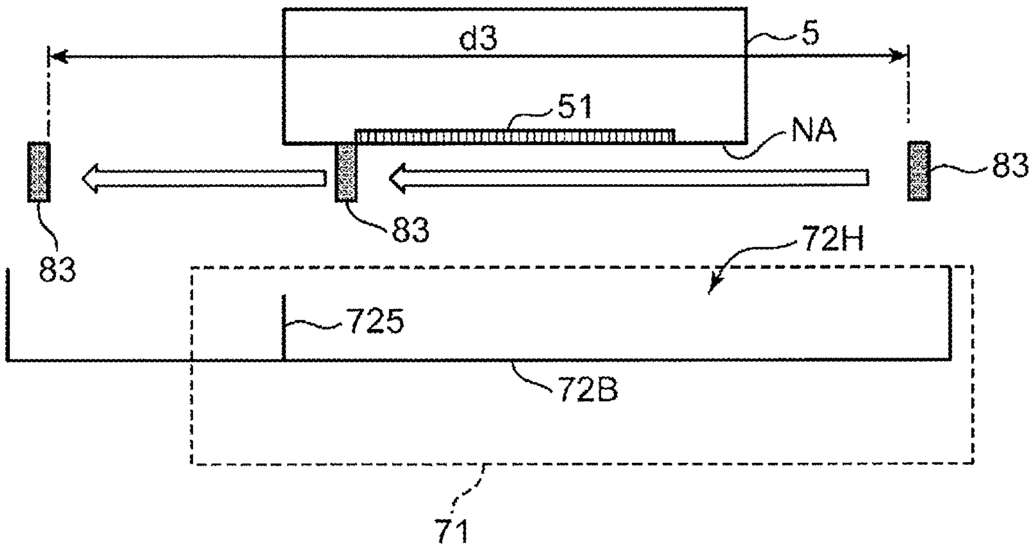

FIG. 15C is a schematic view illustrating a movement range of the processing liquid wiper during wiping.

Figure 16A:
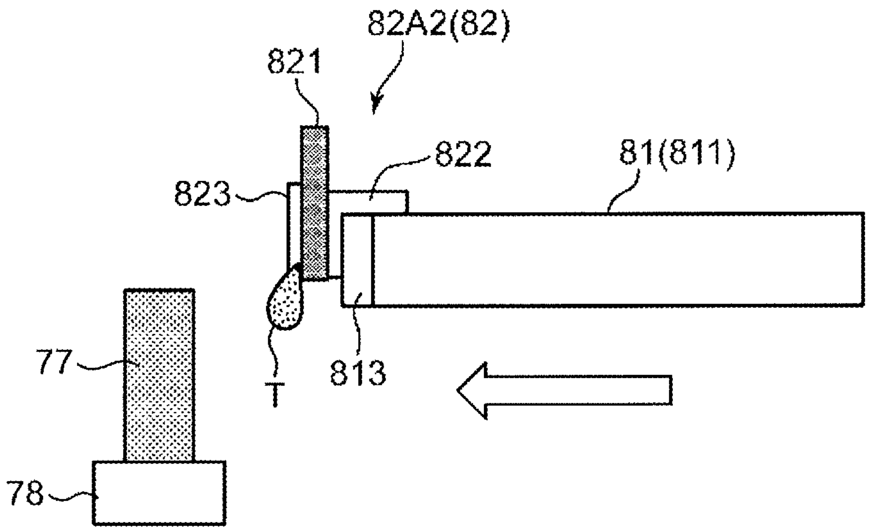

FIG. 16A is a schematic side view illustrating an ink wiper and its cleaning member.

Figure 16B:
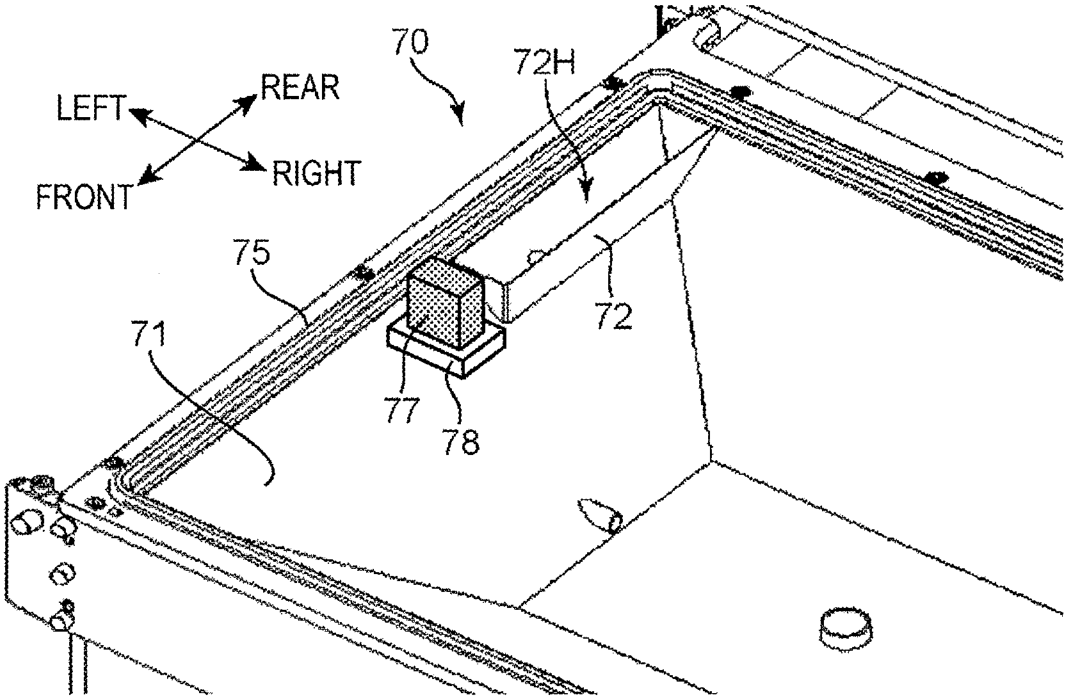

FIG. 16B is a main portion perspective view of the maintenance unit illustrating an arrangement of the cleaning member.

Figure 17:
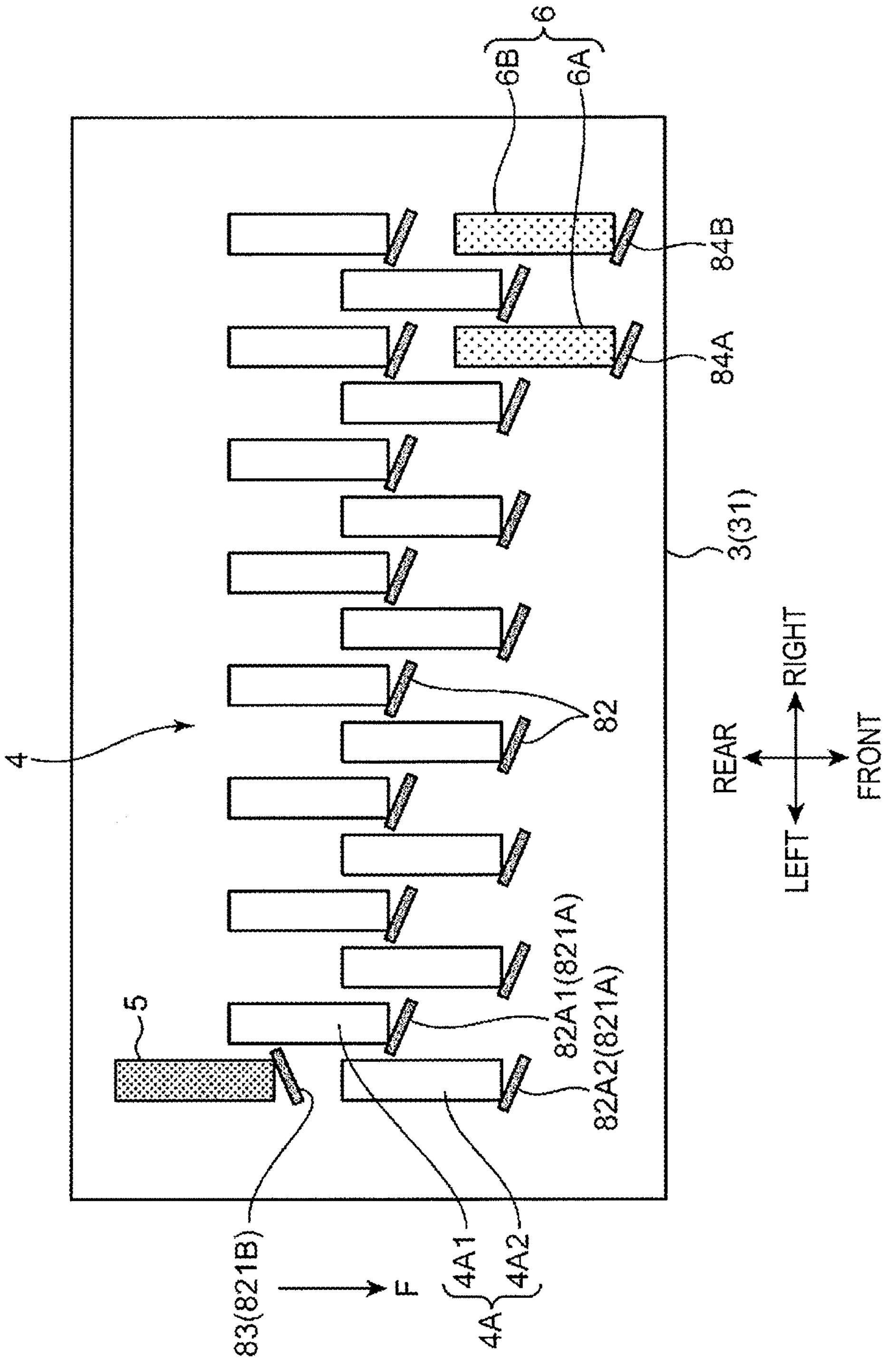

FIG. 17 is a plan view illustrating an inclined arrangement of an ink blade and a processing liquid blade.

Figure 18A:
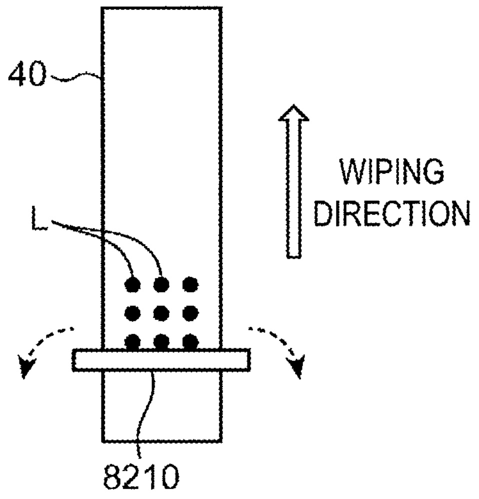

FIG. 18A is a view illustrating a wiping state of the head wiped by a blade having no inclination.

Figure 18B:
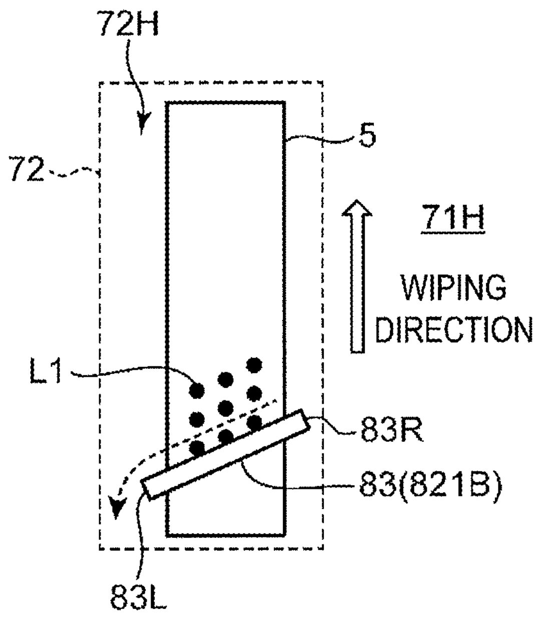

FIG. 18B is a view illustrating a wiping state of the head wiped by the processing liquid blade and the ink blade each having an inclination.

Figure 18C:
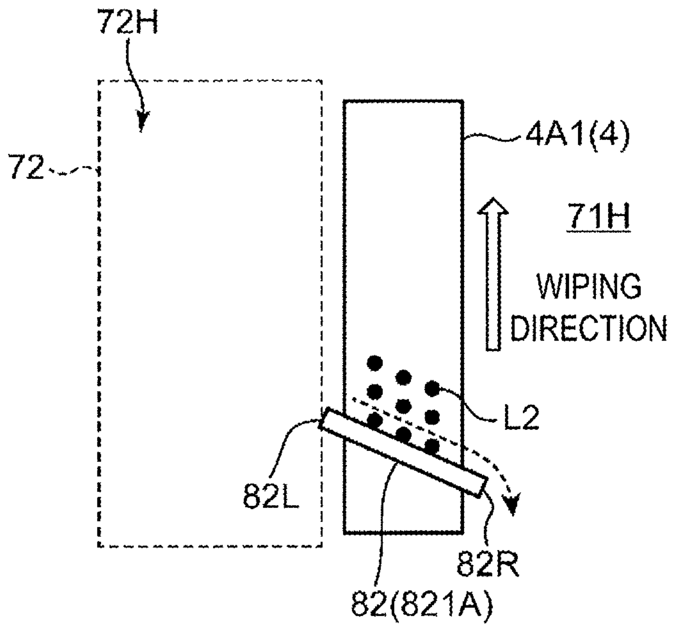

FIG. 18C is a view illustrating a wiping state of the head wiped by the processing liquid blade and the ink blade each having an inclination.

Figure 19:
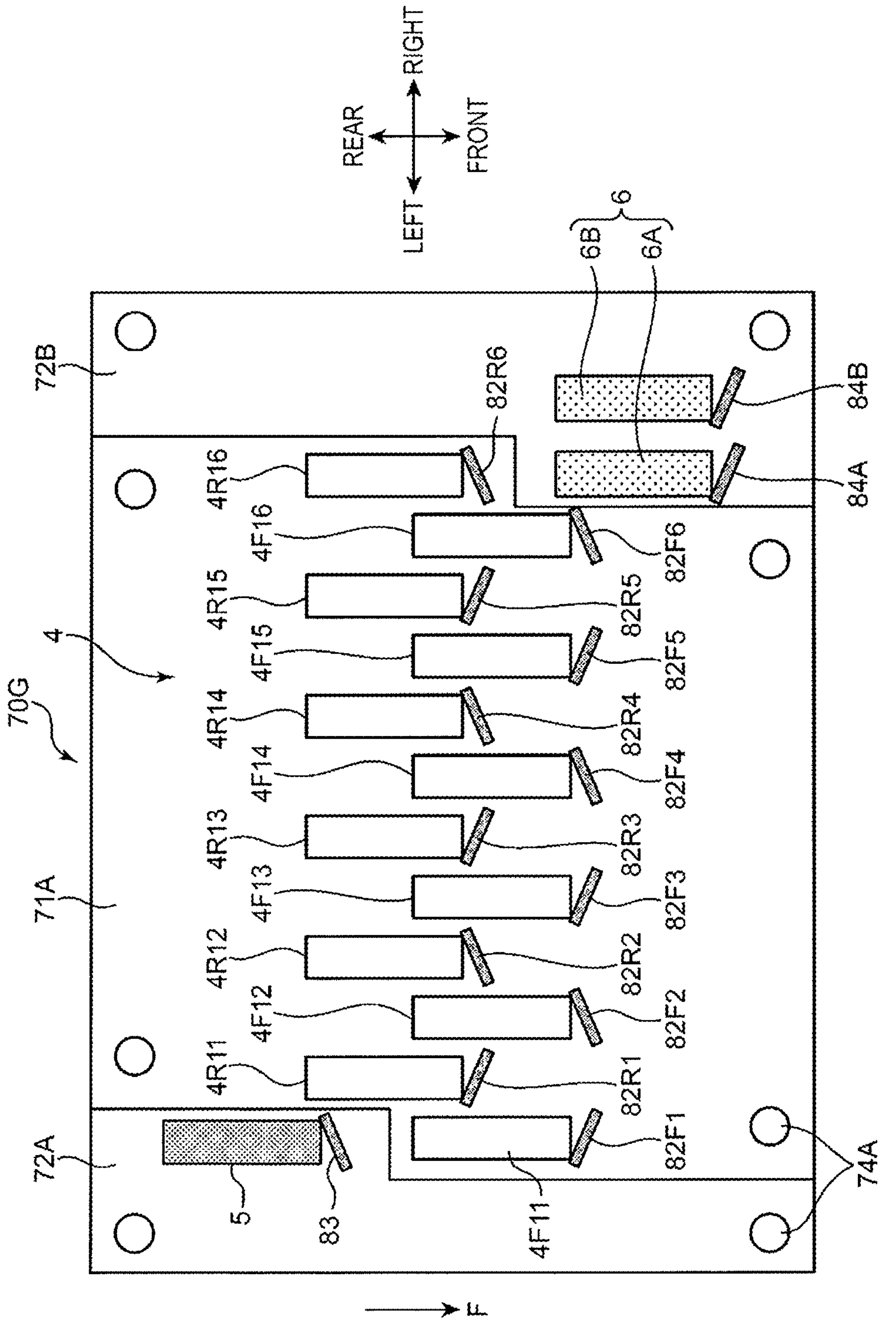

FIG. 19 is a plan view illustrating another example of the inclined arrangement of the wipers.

DESCRIPTION OF EMBODIMENTS

An embodiment of the present disclosure will be described below with reference to the drawings. In the present embodiment, as a specific example of an inkjet recording apparatus, an inkjet printer including an ink head ejecting an ink for image formation onto a wide and long recording medium will be exemplified. The inkjet printer of the present embodiment is suitable for digital textile printing in which images such as characters and patterns are printed on a recording medium made of a fabric such as a woven fabric or a knitted fabric by an inkjet method. Of course, the inkjet recording apparatus according to the present disclosure can also be used to print various inkjet images on a recording medium such as a paper sheet or a resin sheet.

Overall Configuration of Inkjet Printer

Figure 1:
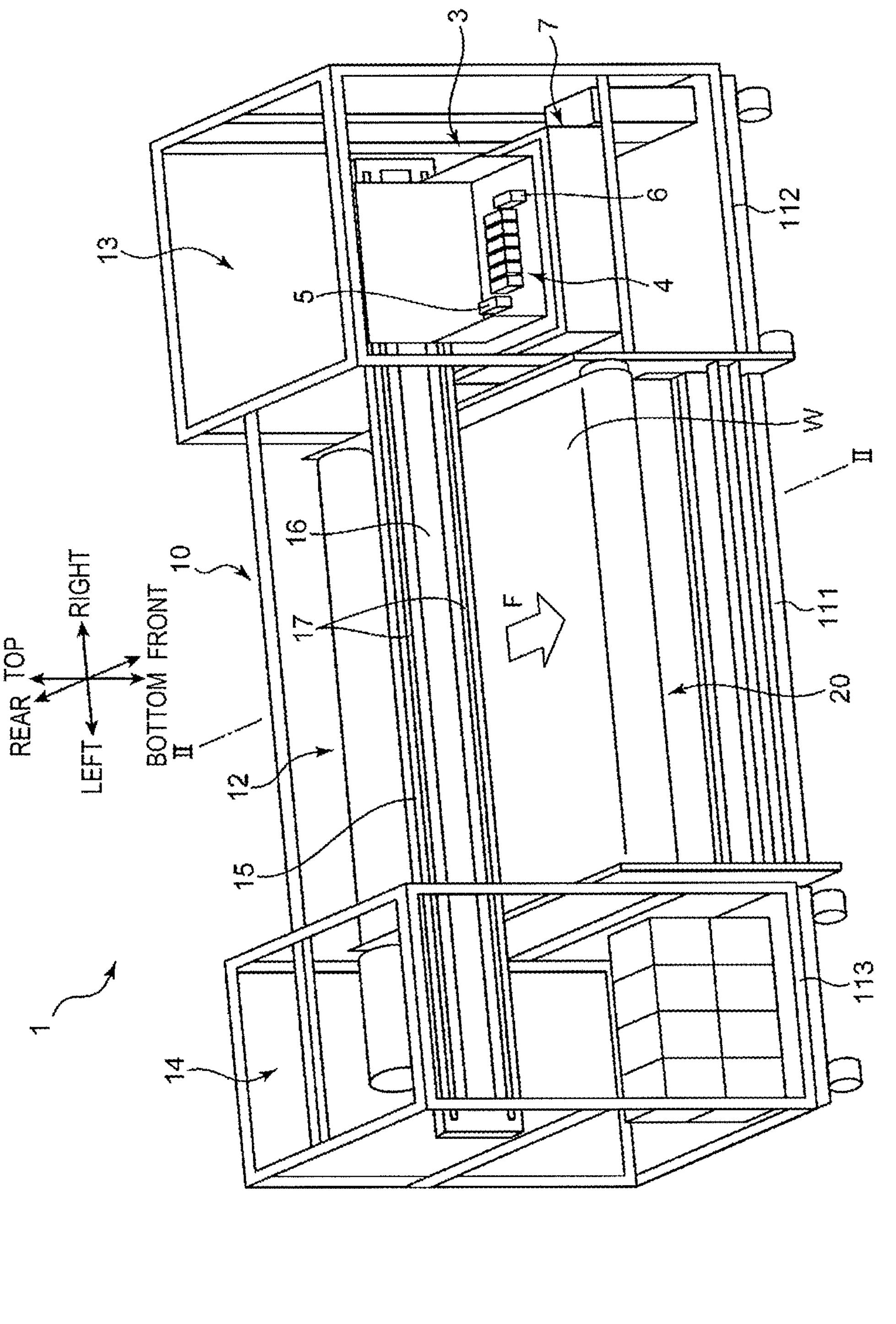
FIG. 1 is a perspective view illustrating an overall configuration of an inkjet printer according to an embodiment of the present disclosure.
Figure 2:
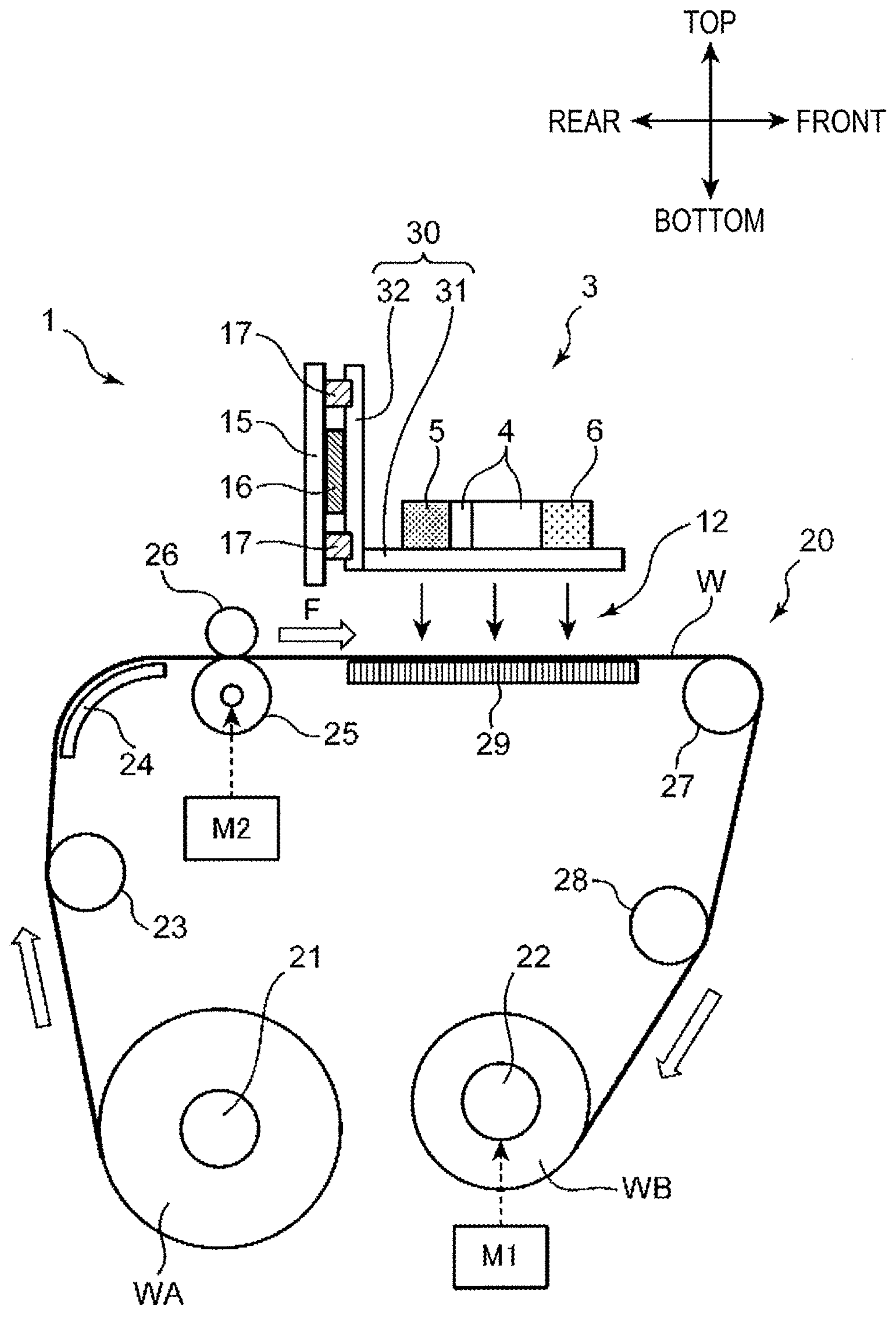
FIG. 2 is a schematic cross-sectional view taken along line II-II in FIG. 1.

FIG. 1 is a perspective view illustrating an overall configuration of an inkjet printer 1 according to an embodiment of the present disclosure, and FIG. 2 is a schematic cross-sectional view taken along line II-II in FIG. 1. The inkjet printer 1 is a printer that prints an image on a wide and long workpiece W by the inkjet method, and includes a apparatus frame 10, and a workpiece conveying portion 20 and a carriage 3 that are incorporated in the apparatus frame 10. In the present embodiment, the left-right direction is a main scanning direction during printing on the workpiece W, and a direction from the rear toward the front is a sub scanning direction that is a conveyance direction F of the workpiece W.

The apparatus frame 10 forms a framework for mounting various constituent members of the inkjet printer 1. The workpiece conveying portion 20 is a mechanism intermittently feeding the workpiece W so that the workpiece W advances in the conveyance direction F from the rear toward the front in a printing region where the inkjet printing processing is performed. An ink head 4, a pre-processing head 5, a post-processing head 6, and a sub-tank (not illustrated) are mounted on the carriage 3, and the carriage 3 reciprocates in the left-right direction during the inkjet printing processing.

The apparatus frame 10 includes a center frame 111, a right frame 112 and a left frame 113. The center frame 111 forms a framework on which various constituent members of the inkjet printer 1 are mounted, and has a left-right width corresponding to the workpiece conveying portion 20. The right frame 112 is erected to the right of the center frame 111, and the left frame 113 is erected to the left of the center frame 111. A space between the right frame 112 and the left frame 113 is a printing area 12 in which the printing processing is executed on the workpiece W.

The right frame 112 forms a maintenance area 13. The maintenance area 13 is an area in which the carriage 3 is retracted when the printing processing is not executed. A maintenance unit 7 is disposed in the maintenance area 13. The maintenance unit 7 is located below the retracted carriage 3. The maintenance unit 7 is a unit for performing wiping processing of wiping a lower surface (nozzle array surface) of each of the ink head 4, the pre-processing head 5, and the post-processing head 6, and purging processing of purging the nozzles. The maintenance unit 7 also functions as a cap for preventing the heads 4, 5, and 6 from drying when the heads 4, 5, and 6 are at rest. The left frame 113 forms a return area 14 of the carriage 3. The return area 14 is an area into which the carriage 3 that has scanned the printing area 12 from right to left in the printing processing temporarily enters before scanning in the reverse direction.

A carriage guide 15 for causing the carriage 3 to reciprocate in the left-right direction is assembled on the upper side of the apparatus frame 10. The carriage guide 15 is a flat plate shape member that is long in the left-right direction, and is disposed above the workpiece conveying portion 20. A timing belt 16 is attached to the carriage guide 15 so as to be capable of circumferential movement in the left-right direction (main scanning direction). The timing belt 16 is an endless belt, and is driven by a drive source (not illustrated) so as to perform the circumferential movement in the left or right direction.

The carriage guide 15 is provided with a pair of upper and lower guide rails 17 that extend parallel to each other in the left-right direction. The carriage 3 includes an engaging portion with respect to the guide rails 17. The carriage 3 is fixed to the timing belt 16. The carriage 3 moves in the left direction or the right direction along the carriage guide 15 while being guided by the guide rails 17 as the timing belt 16 moves in a left or right circumferential direction.

Referring mainly to FIG. 2, the workpiece conveying portion 20 includes a feeding roller 21 feeding the workpiece W before printing and a winding roller 22 winding the workpiece W after printing. The feeding roller 21 is disposed at a rear lower portion of the apparatus frame 10 and is a winding shaft of a feeding roll WA that is a wound body of the workpiece W before printing. The winding roller 22 is disposed at a front lower portion of the apparatus frame 10 and is a winding shaft of a winding roll WB that is a wound body of the workpiece W after being subjected to the printing process. A first motor M1 rotationally driving the winding roller 22 around the shaft and causing the winding roller 22 to execute a winding operation of the workpiece W is attached to the winding roller 22.

A path between the feeding roller 21 and the winding roller 22 and passing through the printing area 12 serves as a conveyance path of the workpiece W. In the conveyance path, a first tension roller 23, a workpiece guide 24, a conveyance roller 25 and a pinch roller 26, a return roller 27, and a second tension roller 28 are disposed in this order from the upstream side. The first tension roller 23 applies a predetermined tension to the workpiece W on the upstream side of the conveyance roller 25. The workpiece guide 24 changes the conveyance direction of the workpiece W from the upward direction to the forward direction and conveys the workpiece W into the printing area 12.

The conveyance roller 25 generates a conveyance force intermittently feeding the workpiece W in the printing area 12. The conveyance roller 25 is rotationally driven around the shaft by a second motor M2. The conveyance roller 25 intermittently conveys the workpiece W in the forward direction (conveyance direction F) so that the workpiece W passes through the printing area 12 facing the carriage 3. The pinch roller 26 is disposed to face the conveyance roller 25 from above, and forms a conveyance nip portion with the conveyance roller 25. The return roller 27 changes the conveyance direction of the workpiece W that has passed through the printing area 12 from the forward direction to the downward direction, and guides the workpiece W after the printing process to the winding roller 22. The second tension roller 28 applies a predetermined tension to the workpiece W on the downstream side of the conveyance roller 25. A platen 29 is disposed below the conveyance path of the workpiece W in the printing area 12.

The carriage 3 reciprocates in the main scanning direction (left-right direction) intersecting the conveyance direction F in a state of being cantilevered by the guide rails 17. The carriage 3 includes a carriage frame 30, and the ink head 4, the pre-processing head 5, the post-processing head 6, and a sub-tank (not illustrated) mounted on the carriage frame 30. The carriage frame 30 includes a head support frame 31 and a back frame 32. The head support frame 31 is a horizontal plate holding the above-described heads 4 to 6. The back frame 32 is a vertical plate extending upward from a rear end edge of the head support frame 31. The timing belt 16 is fixed to the back frame 32, and the guide rails 17 are engaged with the back frame 32.

Details of Carriage

Figure 3:
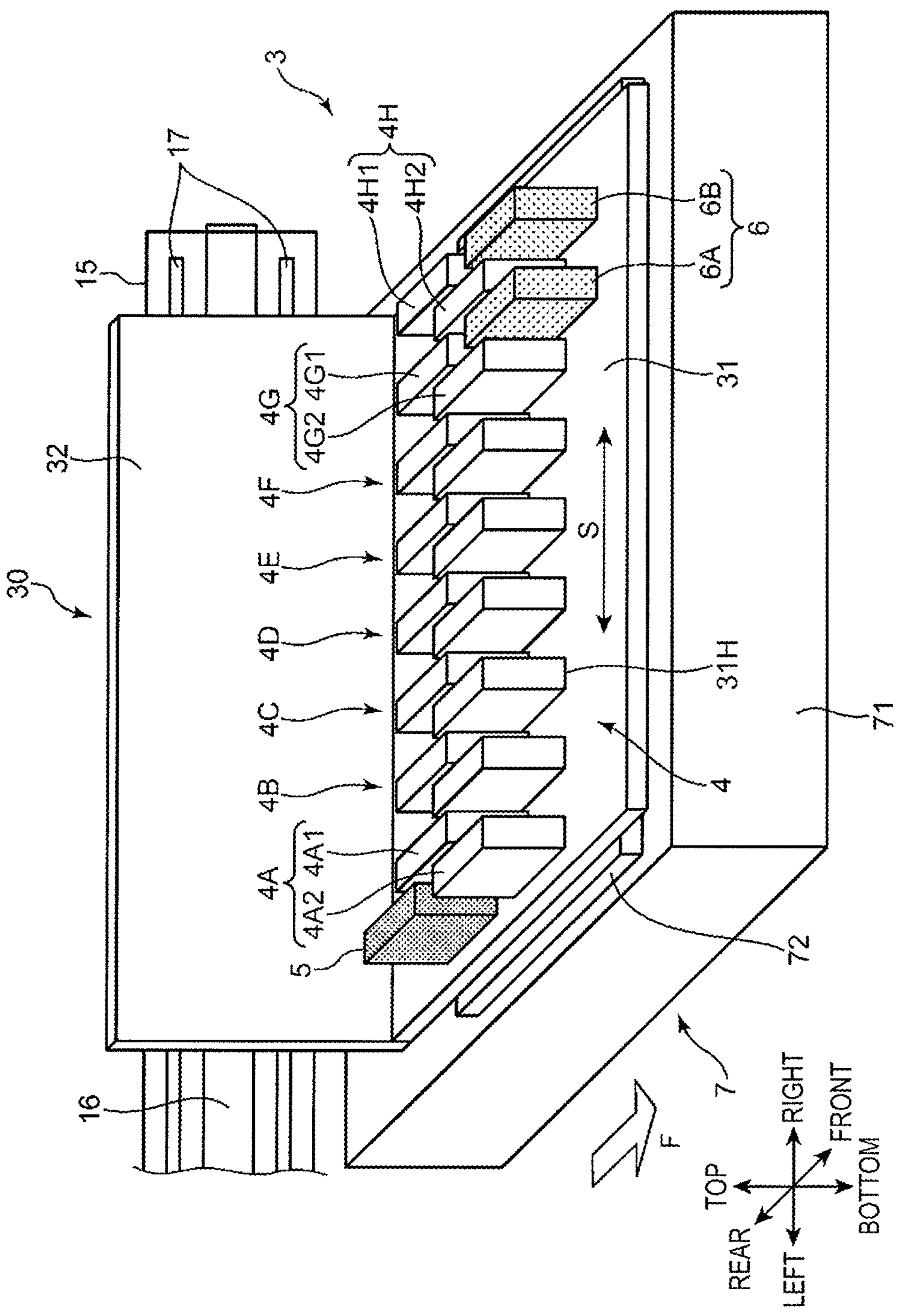
FIG. 3 is an enlarged perspective view of a carriage and a maintenance unit illustrated in FIG. 1.

The carriage 3 will be further described. FIG. 3 is an enlarged perspective view of the carriage 3 illustrated in FIG. 1, and also illustrates the maintenance unit 7. FIG. 3 illustrates the conveyance direction F (sub scanning direction) of the workpiece W and a main scanning direction S that is a movement direction of the carriage 3. FIG. 3 illustrates an example in which a plurality of ink heads 4 each ejecting the ink for image formation onto the workpiece W, and the pre-processing head 5 and the post-processing head 6 ejecting a non-color-developing processing liquid are mounted on the carriage 3. A plurality of the sub-tanks supplying the ink and processing liquid to each of the heads 4, 5, and 6, are also mounted on the actual carriage 3. The processing liquid may be called as a treatment liquid.

Each of the ink heads 4 includes a large number of nozzles each ejecting ink droplets by an ejecting method such as a piezoelectric method using a piezoelectric element or a thermal method using a heating element, and an ink passage guiding an ink to the nozzles. As the ink, for example, an aqueous pigment ink containing an aqueous solvent, a pigment, and a binder resin can be used. The plurality of ink heads 4 in the present embodiment include first to eighth ink heads 4A to 4H ejecting eight color inks, respectively, different from each other.

The ink heads 4A to 4H of the respective colors are mounted on the head support frame 31 of the carriage 3 so as to be arranged in the main scanning direction S. Each of the ink heads 4A to 4H of the respective colors includes two heads. For example, the first ink head 4A includes an upstream-side head 4A1 disposed on the upstream side in the conveyance direction F and a downstream-side head 4A2 disposed at a position on the downstream side of the upstream-side head 4A1 and shifted to the left side in the main scanning direction S. The same applies to the ink heads 4B to 4H of the other colors, respectively. The upstream-side heads of the ink heads 4B to 4H, respectively, are arranged in a row in the main scanning direction S at the same position as the upstream-side head 4A1 in the conveyance direction F, and the downstream-side heads are arranged in a row in the main scanning direction S at the same position as the downstream-side head 4A2 in the conveyance direction F.

The pre-processing head 5 (processing liquid head) and the post-processing head 6 are disposed at positions different from the positions of the ink heads 4, in the conveyance direction F. The pre-processing head 5 is disposed on the upstream side of the ink heads 4 in the conveyance direction F. FIG. 3 illustrates an example in which one pre-processing head 5 is disposed near a left end of an array of the ink heads 4. On the other hand, the post-processing head 6 is disposed on the downstream side of the ink heads 4 in the conveyance direction F. FIG. 3 illustrates an example in which two post-processing heads 6A and 6B are disposed so as to be arranged in the main scanning direction S near the right end of the array of the ink heads 4.

The pre-processing head 5 ejects the pre-processing liquid for applying predetermined pre-processing to the workpiece W. The pre-processing liquid is ejected from the pre-processing head 5 to a position of the workpiece W to which the ink is not ejected from the ink head 4. The pre-processing liquid is a non-color-developing processing liquid that does not develop a color even when adhering to the workpiece W, and is a processing liquid exhibiting, for example, a function of enhancing the fixability of the ink to the workpiece W and/or the aggregation property of an ink pigment. As such a pre-processing liquid, a processing liquid in which a binding resin is blended in a solvent, a processing liquid in which a cationic resin positively charged is blended in a solvent, or the like can be used.

The post-processing head 6 ejects a post-processing liquid for applying predetermined post-processing to the workpiece W to which the ink has adhered. The post-processing liquid is ejected from the post-processing head 6 to a position of the workpiece W after the ink is ejected from the ink head 4. The post-processing liquid is also a non-color-developing processing liquid that does not develop color even when adhering to the workpiece W, and is a processing liquid exhibiting a function of enhancing the fixability and fastness of an ink image printed on the workpiece W by the ink head 4. Here, "fastness" means resistance to rubbing and scraping. As such a post-processing liquid, a silicone-based processing liquid or the like can be used.

Here, the non-color-developing processing liquid refers to a processing liquid that is not recognized by a person by the naked eye as having developed color when printed alone on the recording medium. Here, the color includes a color having a saturation of 0, such as black, white, and gray. The non-color-developing processing liquid is basically a transparent liquid, but for example, when one liter of the processing liquid is viewed in a liquid state, the non-color-developing processing liquid may not be completely transparent and may appear slightly white or the like. Since such a color is very light, a person cannot recognize that the color is developed by the naked eye when the color is printed alone on the recording medium. Depending on the type of processing liquid, when printed alone on the recording medium, there may be changes in the recording medium such as a glossy appearance, but such a state is not considered to be color development.

Openings 31H are provided at the arrangement positions of the heads, respectively, on the head support frame 31. The ink heads 4A to 4F, the pre-processing head 5, and the post-processing head 6 are attached to the head support frame 31 so as to be fitted into the openings 31H, respectively. The nozzles disposed on the lower end surface of each of the heads 4, 5, and 6 are exposed from respective ones of the openings 31H.

As described above, in the present embodiment, the inkjet printer 1 is an all-in-one type printer in which three types of heads of the ink heads 4, the pre-processing head 5, and the post-processing head 6 are mounted on one carriage 3. According to the printer 1, for example, in printing processing of performing inkjet printing on a fabric in digital textile printing, ejecting processing of the pre-processing liquid and ejecting processing of the post-processing liquid can be integrally executed. Thus, the printing processing can be simplified and the printing apparatus can be made compact.

Schematic Configuration of Maintenance Unit

Figure 4:
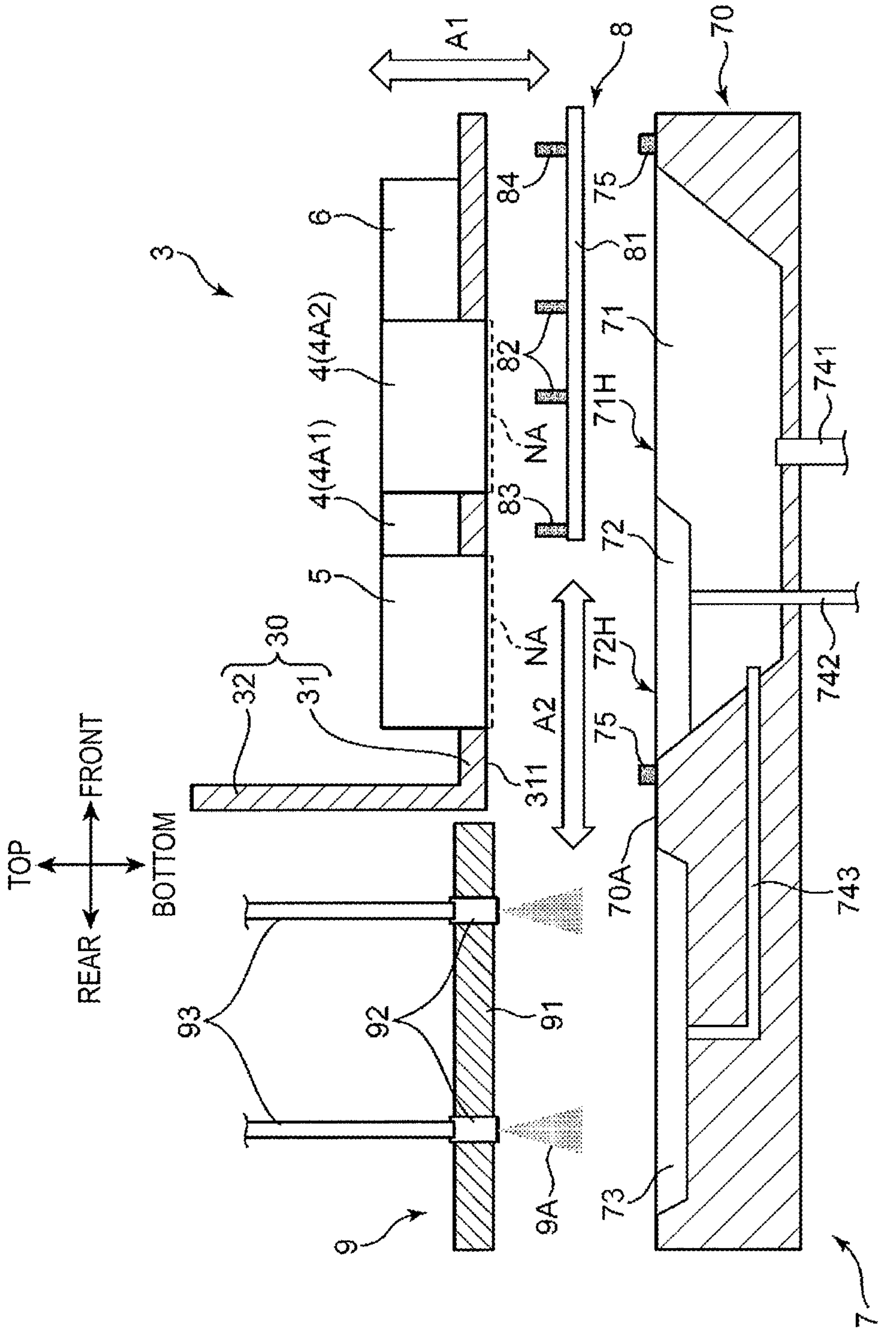
FIG. 4 is a schematic cross-sectional view of the carriage and the maintenance unit.

FIG. 4 is a schematic cross-sectional view of the carriage 3 and the maintenance unit 7 along the front-rear direction. The maintenance unit 7 includes a container unit 70, a wiping unit 8, and a cleaning unit 9. The maintenance area 13 (FIG. 1) is an area in which processing of eliminating clogging of the nozzles of each of the heads 4, 5, and 6 and removing dirt and the like on a nozzle array surface NA of each of the heads 4, 5, and 6 is performed. For this processing, the purge operation, the wiping operation, and a cleaning operation are executed in the maintenance area 13.

The purge operation is an operation of forcibly ejecting pressurized inks, the pre-processing liquid, and the post-processing liquid from the ink heads 4, the pre-processing head 5, and the post-processing head 6, respectively. The container unit 70 collects the inks, the pre-processing liquid, and the post-processing liquid ejected from the heads 4, 5, and 6, respectively, during the purge operation. The wiping operation is an operation of wiping the nozzle array surface NA with a wiper including a wiping member such as a blade. The wiping unit 8 is a unit that executes the wiping operation. The cleaning operation is an operation of cleaning the wiping unit 8 contaminated by the execution of the wiping operation. The cleaning unit 9 is a unit executing the above-described cleaning operation. The container unit 70 also collects a cleaning liquid used in the cleaning operation.

The container unit 70 has a structure in which the pre-processing liquid is collected separately from the ink and the post-processing liquid. In the present embodiment, as described above, the processing liquid enhancing the fixability of the ink and the aggregation property of the ink pigment is used as the pre-processing liquid. Thus, when the pre-processing liquid and the ink are mixed with each other, the mixed liquid may aggregate and cause trouble when being collected in a waste liquid tank. On the other hand, even if the post-processing liquid used in the present embodiment is mixed with the ink, aggregation or the like does not occur. This is the reason for the above-described separate collection in the container unit 70.

The container unit 70 includes an ink container 71, a pre-processing liquid container 72 (processing liquid container), and a cleaning liquid tray 73. The ink container 71 is a container collecting the inks and the post-processing liquid ejected from the ink heads 4 and the post-processing head 6, respectively, in the purge operation. The ink container 71 includes, at an upper surface thereof, a first opening 71H that receives the inks and the post-processing liquid. The first opening 71H opens upward at a position facing at least the nozzle array surface NA of each of the ink heads 4 and the post-processing head 6 in the up-down direction. The ink container 71 also collects the inks and the post-processing liquid wiped from the nozzle array surfaces NA in the wiping operation.

The pre-processing liquid container 72 is disposed at a position covering a part of the upper side of the first opening 71H. The pre-processing liquid container 72 is a container collecting the pre-processing liquid ejected from the pre-processing head 5 in the purge operation. The pre-processing liquid container 72 includes, at an upper surface thereof, a second opening 72H receiving the pre-processing liquid. The second opening 72H is open upward at a position facing at least the nozzle array surface NA of the pre-processing head 5 in the up-down direction. The pre-processing liquid container 72 also collects the pre-processing liquid wiped from the nozzle array surface NA in the wiping operation. The cleaning liquid tray 73 is a container collecting the cleaning liquid 9A injected from the cleaning liquid cleaning unit 9 in the cleaning operation.

The container unit 70 includes an overflow passage 741, a processing liquid passage 742, and a relay passage 743 for circulation of the collected liquid. The overflow passage 741 is a passage including a starting end opening at a bottom surface of the ink container 71 and a terminal end side located toward a waste liquid container (not illustrated). The processing liquid passage 742 is a passage including a starting end opening near a bottom surface of the pre-processing liquid container 72 and a terminal end side located toward the waste liquid container. The relay passage 743 is a passage including a starting end opening at a bottom surface of the cleaning liquid tray 73 and a terminal end opening near the bottom surface of the ink container 71. That is, the cleaning liquid 9A collected in the cleaning liquid tray 73 is once introduced into the ink container 71 and then collected in the waste liquid container through the overflow passage 741.

Here, "receiving" the liquid means receiving the liquid falling from above. Although the liquid flows from the cleaning liquid tray 73 into the ink container 71 through the relay passage 743, this is not included in the above-described "receiving" the liquid. The liquid flowing from the cleaning liquid tray 73 contains a small amount of inks, the pre-processing liquid, and the post-processing liquid in addition to the cleaning liquid. However, the concentration of the pre-processing liquid is low, and thus the pre-processing liquid does not substantially coagulate even when the pre-processing liquid enters the ink container 71. A partition may be provided in the cleaning liquid tray 73 so as to enable a liquid containing no pre-processing liquid to flow into the ink container 71.

A cap rubber 75 is mounted on an upper surface 70A of the container unit 70. The cap rubber 75 is disposed so as to surround the peripheral edge of the first opening 71H of the ink container 71. The carriage 3 is movable in the up-down direction as indicated by an arrow A1 in the drawing. When the carriage 3 enters a standby mode in the maintenance area 13, when the printer 1 is at rest, or the like, the carriage 3 is lowered and a lower surface 311 of the head support frame 31 is brought into surface contact with the cap rubber 75. As a result, the nozzle array surface NA of each of the heads 4, 5, and 6 is sealed.

The wiping unit 8 includes the wiper support plate 81 (support plate), and ink wipers 82, a pre-processing liquid wiper 83 (processing liquid wiper), and a post-processing liquid wiper 84 which are supported by the wiper support plate 81. The wiping unit 8 is movable in the front-rear direction as indicated by an arrow A2 in the drawing. The wiper support plate 81 is a flat plate shape member and moves in the front-rear direction between the carriage 3 and the cleaning unit 9, and the container unit 70. The ink wiper 82 wipes the nozzle array surface NA of the ink head 4 by moving in the rearward direction while being in contact with the nozzle array surface NA. Similarly, the pre-processing liquid wiper 83 and the post-processing liquid wiper 84 wipe the nozzle array surfaces NA of the pre-processing head 5 and the post-processing head 6, respectively.

The cleaning unit 9 includes a nozzle holding plate 91 and a plurality of cleaning nozzles 92 held by the nozzle holding plate 91. The nozzle holding plate 91 is made of a flat plate shape member and is fixedly disposed so as to face the cleaning liquid tray 73 of the container unit 70. The plurality of cleaning nozzles 92 are disposed at positions corresponding to the ink wipers 82, the pre-processing liquid wiper 83, and the post-processing liquid wiper 84, respectively, mounted on the wiper support plate 81. That is, when the wiping unit 8 moves to a predetermined position directly below the cleaning unit 9, the plurality of cleaning nozzles 92 are held by the nozzle holding plate 91 at positions facing the wipers 82, 83, and 84, respectively, from above. Each of the cleaning nozzles 92 dissipates the cleaning liquid 9A in a fan-shaped spray form. The cleaning liquid 9A is supplied to the cleaning nozzle 92 from a cleaning liquid tank (not illustrated) via a cleaning liquid hose 93.

Control Configuration

Figure 5:
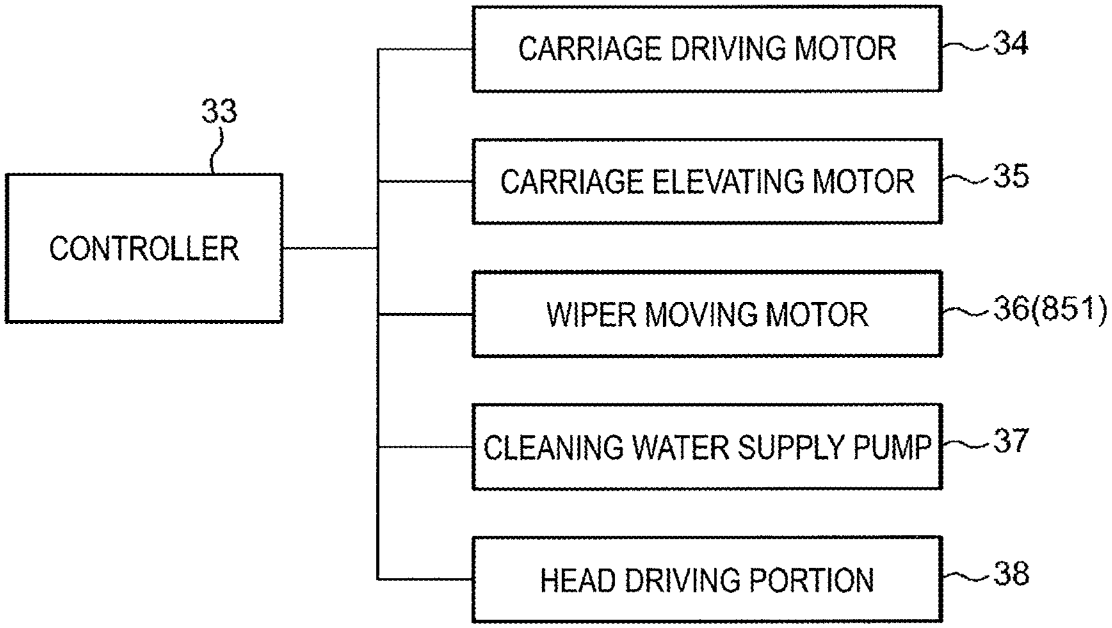
FIG. 5 is a block diagram illustrating a control configuration of the inkjet printer.

FIG. 5 is a block diagram illustrating a part of a control configuration of the printer 1. The printer 1 includes a controller 33, a carriage driving motor 34 whose operation is controlled by the controller 33, a carriage elevating motor 35, a wiper-moving motor 36, a cleaning water supply pump 37, and a head driving portion 38.

The carriage driving motor 34 generates a driving force moving the carriage 3 in the left-right direction within a range of the return area 14, the printing area 12, and the maintenance area 13 (FIG. 1). The carriage driving motor 34 drives the timing belt 16 (FIGS. 1 to 3). The carriage elevating motor 35 generates a driving force moving the carriage 3 in the up-down direction in the maintenance area 13. The wiper-moving motor 36 generates a driving force moving the wiping unit 8 in the front-rear direction. The cleaning water supply pump 37 is connected to the cleaning liquid hose 93 and supplies the cleaning liquid 9A to the cleaning nozzle 92 at a predetermined pressure. The head driving portion 38 executes an ejecting operation of ejecting the inks, the pre-processing liquid, and the post-processing liquid from the heads 4, 5, and 6, respectively.

When the purge operation is executed, the controller 33 controls the wiper-moving motor 36 to move the wiping unit 8 rearward to a retracted position below the cleaning unit 9. Next, the controller 33 controls the head driving portion 38 to eject the inks, the pre-processing liquid, and the post-processing liquid from the heads 4, 5, and 6, respectively, at a high pressure to clean the nozzles. The inks and the post-processing liquid, and the pre-processing liquid ejected by the purge operation are collected by the ink container 71 and the pre-processing liquid container 72, respectively.

When the wiping operation is executed, the controller 33 controls the wiper-moving motor 36 to move the wiping unit 8 to the foremost wiping start position. Next, the controller 33 controls the carriage elevating motor 35 to lower the nozzle array surface NA of each of the heads 4, 5, and 6 to height positions coming into contact with the wipers 82, 83, and 84, respectively, of the wiping unit 8. Thereafter, the controller 33 moves the wiping unit 8 rearward. The inks and the post-processing liquid wiped from the nozzle array surfaces NA by the wiping of the ink wipers 82 and the post-processing liquid wiper 84, respectively, are collected by the ink container 71. In addition, the pre-processing liquid wiped from the nozzle array surface NA by the wiping of the pre-processing liquid wiper 83 is collected by the pre-processing liquid container 72.

When the cleaning operation is executed, the controller 33 controls the wiper-moving motor 36 to move the wiping unit 8 rearward to a retracted position below the cleaning unit 9. Next, the controller 33 controls the cleaning-water supply pump 37 to supply the cleaning liquid 9A to the cleaning nozzle 92 via the cleaning liquid hose 93. As a result, the cleaning liquid 9A is sprayed onto each of the wipers 82, 83, and 84 of the wiping unit 8, and foreign matter adhering to the wipers 82, 83, and 84 due to the wiping is removed. The cleaning liquid 9A is collected in the cleaning liquid tray 73.

Detailed Structure of Maintenance Unit

Figure 6:
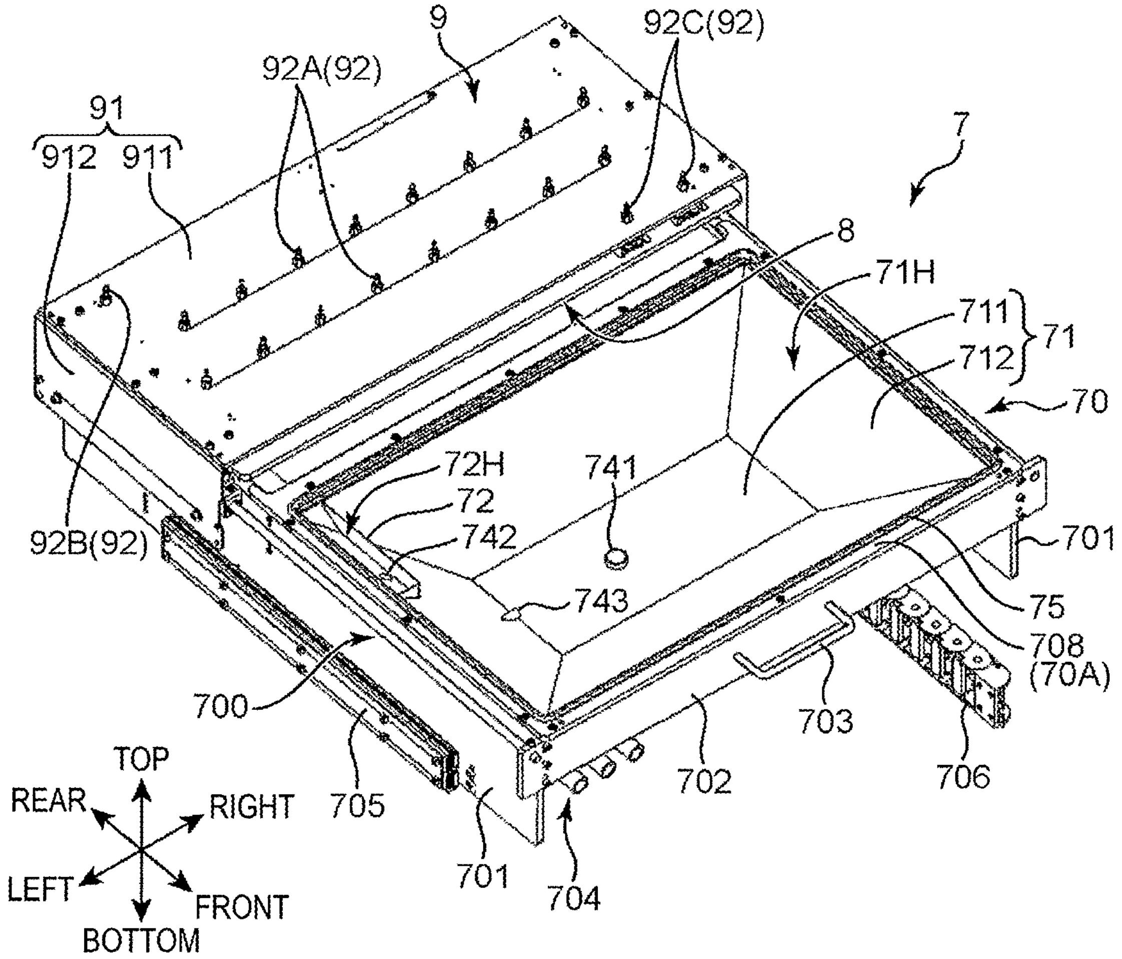
FIG. 6 is an overall perspective view of the maintenance unit.
Figure 8A:
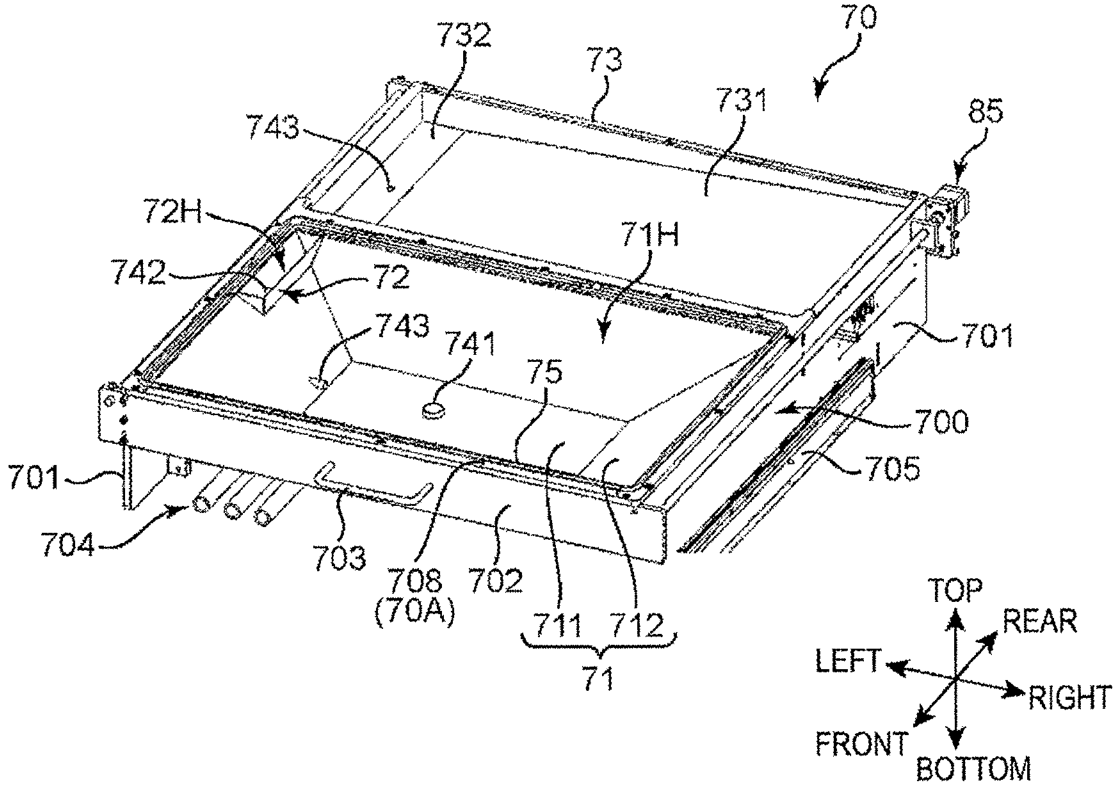
FIG. 8A is a perspective view of a state in which a wiping unit is further removed from the state in FIG. 7.
Figure 8B:
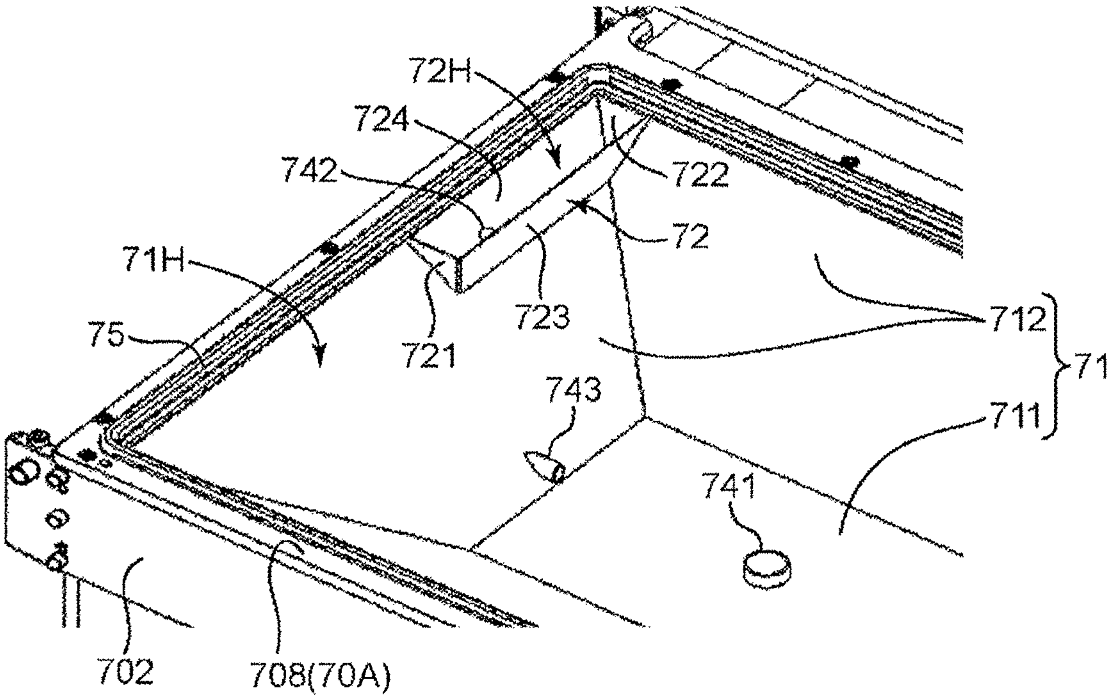
FIG. 8B is an enlarged view near a processing liquid container in FIG. 8A.

Next, one specific embodiment of the above-described maintenance unit 7 will be illustrated and a detailed structure thereof will be described. FIG. 6 is an overall perspective view of the maintenance unit 7, FIG. 7 is a perspective view illustrating a state in which the cleaning unit 9 is removed from FIG. 6, FIG. 8A is a perspective view illustrating a state in which the wiping unit 8 is further removed from the state illustrated in FIG. 7, and FIG. 8B is an enlarged view near the pre-processing liquid container 72 in FIG. 8A. FIGS. 6 and 7, illustrate a standby state of waiting for a wiping command or a state in which the cleaning operation is executed and illustrate a state in which the wiping unit 8 is moved to the rearmost end side.

As described above, the maintenance unit 7 includes the container unit 70, the wiping unit 8, and the cleaning unit 9. The container unit 70 is mounted on the apparatus frame 10 (FIG. 1) so as to be capable of being pulled out forward in the maintenance area 13. The wiping unit 8 is assembled so as to be movable with respect to the container unit 70 in the front-rear direction. The cleaning unit 9 is fixedly attached to the apparatus frame 10.

Container Unit

The container unit 70 includes a frame structure 700 having a rectangular parallelepiped shape slightly elongated in the front-rear direction, the ink container 71 and the pre-processing liquid container 72 disposed on the front side of the frame structure 700, and the cleaning liquid tray 73 disposed on the rear side of the frame structure 700. The frame structure 700 includes a pair of left and right side frames 701 extending in the front-rear direction, and a front frame 702 connecting front ends of the side frames 701 with each other.

A handle 703 for pulling out the container unit 70 forward is mounted on the front frame 702. A plurality of waste liquid hoses 704 are drawn out from below the front frame 702. The waste liquid hoses 704 connect the overflow passage 741 communicating with a cavity of the ink container 71 and the processing liquid passage 742 communicating with a cavity of the pre-processing liquid container 72 to a waste liquid tank (not illustrated). Sliders 705 are mounted on outer side surfaces of the pair of side frames 701, respectively. The sliders 705 engage with guide rails (not illustrated) fixed to the apparatus frame 10, and enables the container unit 70 to be pulled out forward from the apparatus frame 10. A chain protector 706 accommodating an electric cable, a hose, and the like is provided below the frame structure 700. The chain protector 706 deforms as the container unit 70 is pulled out.

The ink container 71 is a saucer-shaped container, and an upper surface of the ink container 71 includes the first opening 71H having a rectangular shape elongated in the left-right direction. The ink container 71 includes a bottom surface 711 having a rectangular shape elongated in the left-right direction, four tapered surfaces 712 extending upward from four end edges of the bottom surface 711, respectively, and an upper end flange 708 formed on the peripheral edge of the first opening 71H. The ink container 71 is a separate body from the frame structure 700 and is fitted into the frame structure 700. The upper end flange 708 of the ink container 71 is supported by the side frames 701 and the front frame 702. A starting end opening of the overflow passage 741 protrudes upward from the bottom surface 711 by a predetermined length. A terminal end opening of the relay passage 743 protrudes from the vicinity of a lower end of the tapered surface 712 on the left side.

The size of the first opening 71H in the left-right direction is substantially equal to a distance between the pair of side frames 701. The size of the first opening 71H in the front-rear direction is slightly larger than half of a front-rear width of the container unit 70. The cap rubber 75 disposed so as to surround the periphery of the first opening 71H is mounted on the upper surface of the upper end flange 708. The upper end flange 708 is a portion corresponding to the upper surface 70A illustrated in the schematic view in FIG. 4. The head support frame 31 of the carriage 3 has a size larger than a region surrounded by the cap rubber 75. On the other hand, an array region of the heads 4, 5, and 6 held by the head support frame 31 has a size slightly smaller than the size of the first opening 71H. The cap rubber 75 comes into contact with the lower surface 311 of the head support frame 31 at the outer periphery of the array region of the heads 4, 5, and 6, and seals the nozzle array surface NA of each of the heads 4, 5, and 6.

Referring to FIGS. 8A and 8B, the pre-processing liquid container 72 is disposed at a position on the left rear of the ink container 71 so as to cover a part of the first opening 71H. The placement position of the pre-processing liquid container 72 is a position to which the pre-processing head 5 held by the carriage 3 directly faces during wiping. For example, when the pre-processing head 5 is disposed at the center or near the right end of the head support frame 31, the pre-processing liquid container 72 is also disposed at a position corresponding thereto. An upper surface of the pre-processing liquid container 72 includes a second opening 72H having a rectangular shape elongated in the front-rear direction so as to correspond to the shape of the nozzle array surface NA of the pre-processing head 5. In the present embodiment, the second opening 72H is at the same height position as the first opening 71H. In other words, the second opening 71H occupies a part of the original region of the first opening 72H.

The pre-processing liquid container 72 is formed by a front wall 721, a rear wall 722, a right wall 723, and a left wall 724. Among these walls, the rear wall 722 uses a portion near the upper end of the tapered surface 712 on the rear side of the ink container 71, and the left wall 724 uses a portion near the upper end of the tapered surface 712 on the left side. The front wall 721 is a wall at the vicinity of an upper end of the tapered surface 712 on the left side and protruding to the right from the vicinity of the center of the tapered surface 712 in the front-rear direction. The right wall 723 is a wall connecting right end edges of the front wall 721 and the rear wall 722, respectively, with each other. The right wall 723 is erected in a substantially vertically upward direction from the tapered surface 712 that is on the left side and inclined to the lower right.

The cleaning liquid tray 73 is a container including an upper surface opening having a rectangular shape elongated in the left-right direction and has a smaller depth than the ink container 71. A bottom surface of the cleaning liquid tray 73 includes an inclined surface 731 and a liquid collecting surface 732. The inclined surface 731 is a surface descending at a gentle slope from a right end side toward a left end side of the cleaning liquid tray 73. The liquid collecting surface 732 is a flat surface located near a left end of the cleaning liquid tray 73 and forming the deepest portion in the bottom surface. The left end edge of the inclined surface 731 is connected to the right end edge of the liquid collecting surface 732. A starting end of the relay passage 743 is open to the liquid collecting surface 732.

Wiping Unit

As illustrated in FIG. 7, the wiping unit 8 includes the wiper support plate 81, the ink wipers 82, the pre-processing liquid wiper 83, the post-processing liquid wiper 84, and a wiper driving portion 85. An upper view in FIG. 9 is a plan view of the wiper support plate 81 holding the wipers 82, 83, and 84 and a lower view in FIG. 9 is a plan view illustrating the arrangement of the ink head 4, the pre-processing head 5, and the post-processing head 6 mounted on the carriage 3 and illustrating a correspondence with the wipers 82, 83, and 84, respectively. The arrangement of the heads 4, 5, and 6 illustrated in the lower view in FIG. 9 is the same as that illustrated in FIG. 3.

The wiper support plate 81 is formed by punching a thin flat plate member, and includes a plurality of protruding plates 811 each having a strip shape. The plurality of protruding plates 811 protrude in the rearward direction, which is the movement direction during wiping. A recessed portion 812 recessed to the front side is formed between adjacent ones of the protruding plates 811. The ink wiper 82 wiping the nozzle array surface NA of the ink head 4 is mounted to an end edge (rear end) of the protruding plate 811 and an end edge of the recessed portion 812. The ink wiper 82 disposed at the end edge of the protruding plate 811 is for wiping the upstream-side head of the ink head 4 of each color, such as an ink wiper 82A1 disposed for the upstream-side head 4A1 of the first ink head 4A. On the other hand, the ink wiper 82 disposed at the end edge of the recessed portion 812 is for wiping the downstream-side head of the ink head 4 of each color, such as an ink wiper 82A2 disposed for the downstream-side head 4A2.

In the wiper support plate 81, a supporting region supporting the pre-processing liquid wiper 83 wiping the nozzle array surface NA of the pre-processing head 5 is disposed at a position protruding rearward in the movement direction during wiping compared to other regions of the wiper support plate 81. Specifically, a protruding piece 814 extends further rearward from the rear end of the protruding plate 811 located at the leftmost position. The pre-processing liquid wiper 83 is mounted to an end edge (rear end) of the protruding piece 814. A window portion 815 corresponding to the recessed portion 812 is provided on the front side of the protruding piece 814. As described above, the pre-processing liquid wiper 83 is disposed to be supported at a position in the wiper support plate 81 most protruding in the movement direction, so that the pre-processing liquid wiped by the pre-processing liquid wiper 83 during wiping is less likely to adhere to other portions of the wiper support plate 81.

As illustrated in the lower view in FIG. 9, in the present embodiment, the pre-processing head 5 and the downstream-side head 4A2 of the first ink head 4A are disposed at a position where the pre-processing head 5 and the downstream-side head 4A2 of the first ink head 4A entirely overlap each other in the movement direction (rearward direction) during wiping. That is, the pre-processing head 5 and the downstream-side head 4A2 are disposed side by side on the upstream side and on the downstream side, respectively, in the conveyance direction F at the same position in the left-right direction of the head support frame 31. With such an arrangement, the path through which the ink wiper 82A2 passes from a wiping region toward the cleaning unit 9 overlaps the path wiped by the pre-processing liquid wiper 83. Thus, a risk of the pre-processing liquid dripping onto the ink wiper 82A2 and generating an aggregation can be reduced. The pre-processing head 5 and the downstream-side head 4A2 are desirably disposed in a positional relationship of completely overlapping each other in the movement direction during wiping, but may be disposed to be slightly shifted from each other in the left-right direction.

The right end side of the wiper support plate 81 is a support region supporting the post-processing liquid wiper 84 wiping the nozzle array surface NA of the post-processing head 6. Near the right end of the head support frame 31, two post-processing heads 6A and 6B are disposed side by side in the main scanning direction. The post-processing head 6A on the left side and the post-processing head 6B on the right side are disposed side by side with an upstream-side head 4G1 of a seventh ink head 4G and an upstream-side head 4H1 of an eighth ink head 4H on the upstream side and the downstream side, respectively, in the conveyance direction F.

Corresponding to such a head arrangement, the wiper support plate 81 is provided with a pair of holding pieces 816 and window portions 817 near the right end of the wiper support plate 81. The holding pieces 816 support ink wipers 82G1 and 82H1 wiping the upstream-side heads 4G1 and 4H1 at the rear end edges of the holding pieces 816, respectively. Ink wipers 82G2 and 82H2 wiping the downstream-side heads 4G2 and 4H2, respectively, are supported at the end edges of the recessed portions 812 adjacent to the left sides of the holding pieces 816, respectively. The window portions 817 are openings disposed in front of the holding pieces 816, respectively. At opening edges of the window portions 817 on the front side, the post-processing liquid wipers 84 (84A and 84B) wiping the post-processing heads 6A and 6B, respectively, are supported.

The wiper support plate 81 includes a plurality of protruding portions 813 disposed so as to correspond to the above-described wipers 82, 83, and 84, respectively. Each of the protruding portions 813 is successively provided to the rear end of the protruding plate 811, the base end edge of the recessed portion 812, the rear end of the protruding piece 814, and the base end edge of the window portion 817, respectively. Each of these protruding portions 813 is a small protrusion protruding toward the movement direction during wiping in the shape in a top surface view. The wipers 82, 83, and 84 are disposed on corresponding ones of the protrusions 813. With such an arrangement, the inks and the processing liquids adhering to the wipers 82, and 83 and 84, respectively, can be made difficult to adhere to the wiper support plate 81.

FIG. 10 is a perspective view illustrating a detailed structure of the ink wiper 82. The pre-processing liquid wiper 83 and the post-processing liquid wiper 84 also have a structure the same as, and/or similar to, the ink wiper 82 illustrated here. The ink wiper 82 includes a wiper blade 821 (ink blade or processing liquid blade), a first holder 822, and a second holder 823.

The wiper blade 821 is a plate member actually coming into contact with the nozzle array surface NA to perform the wiping operation. The upper end of the wiper blade 821 is located at a position protruding upward from the upper surface of the wiper support plate 81. The first holder 822 and the second holder 823 are members sandwiching and holding the wiper blade 821 therebetween. The first holder 822 is fitted into a recessed portion provided in the protruding portion 813 and fixed by screws, and supports a lower portion of a back surface of the wiper blade 821. The second holder 823 is attached to a lower portion of a front surface of the wiper blade 821.

The second holder 823 includes a pair of openings 824, and the wiper blade 821 also includes through holes at the same positions as the openings 824, respectively. On the other hand, the first holder 822 includes a pair of claw portions 825. The claw portions 825 are inserted into the through holes and the openings 824, and lock the second holder 823 at the peripheral edge of the openings 824. With this locking force, the wiper blade 821 is held between the first holder 822 and the second holder 823. The wiper blade 821 is held at a position further protruding from a protruding end surface of the protruding portion 813.

The pre-processing liquid wiper 83 and the post-processing liquid wiper 84 may be configured to have the same structure, shape, and material as the ink wiper 82 illustrated in FIG. 10, or may be differently configured from the above. For example, the shape and material of the wiper blade 821 and the support structure of the wiper blade 821 may be different from the ink wiper 82 for the pre-processing liquid wiper 83 and/or the post-processing liquid wiper 84 in accordance with the properties of the ink and/or the processing liquid. As the wiper blade 821, a blade made of a rubber or a resin material having a predetermined rigidity is used. For example, a case is assumed in which the pre-processing liquid has a property of drying faster than the ink and is relatively difficult to be wiped. In this case, the wiping force of the wiper blade 821 is desirably enhanced using, as the wiper blade 821 of the pre-processing liquid wiper 83, a blade having higher rigidity than that of the ink wiper 82, or increasing the protruding height of the wiper blade 821.

FIG. 11A is a perspective view of the maintenance unit 7 with a perspective direction different from that in FIG. 7, and is a view for explaining the wiper driving portion 85. FIG. 11B is an enlarged view of an XIB portion surrounded by a dotted line in FIG. 11A. The wiper driving portion 85 is a mechanism moving the wiper support plate 81 holding the wipers 82, 83, and 84 in the front-rear direction. The wiper driving portion 85 includes a servomotor 851, a ball screw 852, and a slider 853. The servomotor 851 is a motor corresponding to the wiper-moving motor 36 illustrated in FIG. 5.

The servomotor 851 generates a driving force moving the wiper support plate 81. The servomotor 851 is mounted on the right end of a rear plate 707 of the container unit 70. The ball screw 852 is rotationally driven normally or reversely around the shaft by the servomotor 851. The ball screw 852 extends in the front-rear direction along the side frame 701 on the right side. A guide bar (not illustrated) extending in the front-rear direction is attached to the side frame 701 on the left side. The slider 853 contains a nut member screwed to the ball screw 852. When the ball screw 852 is rotated normally or reversely, the slider 853 moves forward and backward in the front-rear direction, respectively, along the ball screw 852.

The slider 853 is connected to the wiper support plate 81. A connecting plate 818 made of an elongated flat plate member is mounted on the upper portion of the slider 853. An end portion 81E on the right side of the wiper support plate 81 is placed on the connecting plate 818, and the connecting plate 818 and the end portion 81E are fastened together by a fixing screw 819. Although not illustrated, an end portion on the left side of the wiper support plate 81 is also supported by members equivalent to the coupling plate 818 and the slider 853, and is guided along the guide bar.

A movement range of the wiper support plate 81 is between a front end (wiping area) and a rear end (cleaning area) of the container unit 70. For example, when the servomotor 851 is rotationally driven normally by the controller 33, the slider 853 is fed in the forward direction, and the wiper support plate 81 fixed to the slider 853 also moves in the forward direction. On the other hand, when the servomotor 851 is rotationally driven reversely, the wiper support plate 81 moves in the rearward direction.

Cleaning Unit

Referring to FIG. 6, the cleaning unit 9 includes the nozzle holding plate 91 and the plurality of cleaning nozzles 92. The nozzle holding plate 91 is a U-shaped frame member including a top plate 911 and a pair of left and right side plates 912. The top plate 911 is a flat plate having a width slightly larger than a left-right width of the container unit 70. The pair of side plates 912 are flat plates hanging down from the left end and the right end, respectively, of the top plate 911, and face the left and right side frames 701, respectively.

The nozzle holding plate 91 is fixed at an appropriate position on the apparatus frame 10 (FIG. 1). In a state where the container unit 70 is loaded at a predetermined position on the apparatus frame 10, the nozzle holding plate 91 is in a positional relationship of being fitted into a rear region of the container unit 70 from above. A portion where the nozzle holding plate 91 covers the container unit 70 serves as a cleaning area for cleaning the ink wipers 82, the pre-processing liquid wiper 83, and the post-processing liquid wiper 84. The top plate 911 faces the cleaning liquid tray 73 of the container unit 70 in the up-down direction with a predetermined gap therebetween. The gap has an up-down width allowing the wiping unit 8 to enter between the top plate 911 and the cleaning liquid tray 73.

The plurality of cleaning nozzles 92 are disposed at appropriate positions on the top plate 911 so as to match an arrangement of the wipers 82, 83, and 84 on the wiper support plate 81. The plurality of cleaning nozzles 92 include nozzles 92A cleaning the ink wipers 82, a nozzle 92B cleaning the pre-processing liquid wiper 83, and a nozzle 92C cleaning the post-processing liquid wiper 84. The nozzles 92A, 92B, and 92C eject the cleaning liquid 9A in the fan-shaped spray form from the lower end surfaces thereof (see FIG. 4), to clean the wipers 82, 83, and 84, respectively.

Movement Path During Wiping Operation

Next, a movement path of the wiping unit 8 during wiping including a positional relationship with respect to peripheral members will be described. FIG. 12 is a perspective view illustrating an initial position of the wiping unit 8 during wiping. During wiping, the wiping unit 8 moves from the initial position toward the rear toward the cleaning area where the cleaning unit 9 is disposed. An area above the first opening 71H of the ink container 71 and the second opening 72H of the pre-processing liquid container 72 serves as the wiping area where the wipers 82, 83, and 84 wipe the heads 4, 5, and 6, respectively.

To the left of the maintenance unit 7, there is the printing area 12 (FIG. 1) where an ink is ejected from the ink head 4 to form an image. For this reason, when the carriage 3 temporarily stops in the maintenance area 13, the carriage 3 enters the maintenance area 13 from the left side of the maintenance unit 7. As illustrated in FIG. 9, the pre-processing head 5 is supported by the carriage 3 at the leftmost position side by side with the downstream-side head 4A2 of the first ink head 4A. In line with this, the pre-processing liquid wiper 83 is also disposed at the leftmost position in the wiper support plate 81.

That is, in the movement direction in which the carriage 3 moves from the printing area 12 to the wiping area, the pre-processing liquid wiper 83 is disposed at a position closer to the printing area 12 than the other ink wipers 82 except for the ink wiper 82A2 for the downstream-side head 4A2. According to this arrangement, the pre-processing liquid container 72 is naturally disposed near the left end of the ink container 71. In this case, an arrangement in which the pre-processing head 5 does not pass through the first opening 71H of the ink container 71 at the time of the temporary stop can be realized. This makes it difficult for the pre-processing liquid adhering to the pre-processing head 5 to drip into the ink container 71.

In the movement direction from the wiping area to the cleaning area, the pre-processing liquid wiper 83 is supported by the wiper support plate 81 at the position closest to the cleaning area among the wipers 82, 83, and 84. That is, as illustrated in the upper view in FIG. 9 (region A), the pre-processing liquid wiper 83 is disposed at the end edge of the protruding piece 814 protruding most rearward in a top surface view in the wiper support plate 81. Thus, the pre-processing liquid wiper 83 can be introduced into the cleaning area most quickly to apply the cleaning processing. For example, in a case where the pre-processing liquid has a quick-drying property, if the nozzle 92B (FIG. 6) cleaning the pre-processing liquid wiper 83 is disposed on the front-most side of the nozzle holding plate 91, the pre-processing liquid wiper 83 can be immediately cleaned.

FIG. 13 is a top view of the maintenance unit 7 illustrating a movement path MW of the wiping unit 8 during wiping. A position indicated by a dotted line in the drawing is an initial position of the wiping unit 8 and the pre-processing liquid wiper 83 during wiping. In FIG. 13, a position of the wiping unit 8 indicated by a solid line is a wiping completion position where the wipers 82, 83, and 84 are cleaned, and a standby position waiting for an instruction for executing the wiping operation.

In the present embodiment, the movement path MW (movement range) of the pre-processing liquid wiper 83 during wiping is set to a position without a region directly above the first opening 71H of the ink container 71. Specifically, the movement range when the pre-processing liquid wiper 83 performs the wiping operation in the wiping area is set directly above the second opening 72H of the pre-processing liquid container 72. In other words, the first opening 71H is practically not located directly below a region where the pre-processing liquid wiper 83 wipes the nozzle array surface NA of the pre-processing head 5, and most or all of the region faces the second opening 72H in the up-down direction. In other words, the first opening 71H of the ink container 71 is disposed at a position other than a region where the pre-processing liquid wiper 83 wipes the nozzle array surface NA when viewed from above. With this arrangement, the likelihood of the pre-processing liquid wiped by the pre-processing liquid wiper 83 during wiping mixing into the ink container 71 through the first opening 71H can be reduced. Thus, an occurrence of a chemical reaction such as the aggregation of the ink can be suppressed.

When the ink container 71 and the pre-processing liquid container 72 are viewed in the direction along the movement path MW (front-rear direction), it can be said that a part of the first opening 71H (left end front portion) and the second opening 72H are disposed in series (see FIG. 13). That is, a part of the first opening 71H is disposed on the front side and the second opening 72H is disposed on the rear side. An orientation direction of the movement path MW, that is, the movement direction of the pre-processing liquid wiper 83 is from the front side to the rear side. In other words, the movement direction of the pre-processing liquid wiper 83 is a direction away from the first opening 71H. Moreover, as illustrated in FIG. 8B, the rear end edge (rear wall 722) of the pre-processing liquid container 72 is flush with the rear end edge (tapered surface 712 on the rear side) of the ink container 71. In other words, the first opening 71H is not interposed between the rear end edge of the pre-processing liquid container 72 and the cleaning area in the movement path MW. Thus, the pre-processing liquid, which may be scattered when the pre-processing liquid wiper 83 finishes the wiping of the pre-processing head 5 and separates from the nozzle array surface NA, can be suppressed from entering the ink container 71.

The orientation direction of the movement path MW is a direction in which the cleaning area where the cleaning unit 9 is disposed is located. Such an arrangement also contributes to a measure against scattering of the pre-processing liquid. That is, when the pre-processing liquid wiper 83 separates from the nozzle array surface NA of the pre-processing head 5, even if the pre-processing liquid adhering to the pre-processing liquid wiper 83 is scattered, the scattering destination of the pre-processing liquid is the cleaning area. In the cleaning area, the scattered pre-processing liquid is diluted with a relatively large amount of cleaning liquid and is collected by the cleaning liquid tray 73. Thus, an operation can be realized in which droplets of the pre-processing liquid are unlikely to enter the ink container 71.

Position Without Position Immediately Above First Opening

Variations of the above-described "position without a region directly above the first opening 71H" will be described. FIGS. 14A to 14D are schematic views illustrating various arrangement examples of the pre-processing liquid container 72 without a region directly above the first opening 71H of the ink container 71. FIGS. 14A to 14C are schematic cross-sectional views of the maintenance unit 7 in the left-right direction, and FIG. 14D is a top view. The "position without a region directly above" includes a position where another member is interposed between a partial region of the first opening 71H and the pre-processing liquid wiper 83 in addition to a case where the position is out of an upper space of the first opening 71H.

FIG. 14A illustrates an example in which the movement range of the pre-processing liquid wiper 83 is set to a position without a region directly above the first opening 71H by disposing the pre-processing liquid container 72 at a position covering a part of the first opening 71H. The example in FIG. 14A is the same as or similar to, the example illustrated in FIG. 8A described above. In this example, the "position without a region directly above the first opening 71H" is achieved by disposing the second opening 72H of the pre-processing liquid container 72 below the movement range of the pre-processing liquid wiper 83 while the movement range of the pre-processing liquid wiper 83 is set to be above the first opening 71H.

FIG. 14B illustrates an example in which the movement range of the pre-processing liquid wiper 83 is simply set to a position out of the upper space of the first opening 71H. In this example, the pre-processing liquid container 72 is naturally disposed at a position not overlapping the first opening 71H in the up-down direction. FIG. 14C illustrates an example in which another member is interposed between the first opening 71H and the pre-processing liquid wiper 83. The pre-processing liquid container 72 is disposed adjacent to the ink container 71. On the other hand, the pre-processing liquid wiper 83 is located above the first opening 71H in order to wipe the pre-processing head 5 disposed above the first opening 71H. A guide plate 76 is disposed below the pre-processing liquid wiper 83 in a downward inclining manner in a direction toward the second opening 72H. The pre-processing liquid wiped from the pre-processing head 5 by the pre-processing liquid wiper 83 is guided to the second opening 72H through the guide plate 76.

FIG. 14D illustrates an example in which the "position without a region directly above the first opening 71H" is achieved by devising the shape of the ink container 71. The ink container 71 includes a notch portion 713 at a position corresponding to the lower side of the arrangement region of the pre-processing head 5. Thus, the movement range of the pre-processing liquid wiper 83 is out of the first opening 71H. The pre-processing liquid container 72 is disposed in the notch portion 713.

Positional Relationship Between Movement Range and Second Opening

Next, a positional relationship between the movement range of the pre-processing liquid wiper 83 and the second opening 72H of the pre-processing liquid container 72 will be described. FIGS. 15A to 15C are schematic views for explaining the movement range of the pre-processing liquid wiper 83 during the wiping operation. FIG. 15A illustrates an actual wiping range d1 in which the pre-processing liquid wiper 83 substantially performs the wiping operation. The actual wiping range d1 corresponds to the width of a nozzle array portion 51 in which a large number of nozzles ejecting the pre-processing liquid are arrayed in the pre-processing head 5. That is, in the movement direction of the pre-processing liquid wiper 83, d1 is a length from the upstream end (front end) to the downstream end (rear end) of the nozzle array portion 51. The nozzle array portion 51 is a portion to which the pre-processing liquid actually adheres. Thus, a span in which the pre-processing liquid wiper 83 (wiper blade 821) moves in the actual wiping range d1 serves as a section in which the pre-processing liquid wiper 83 substantially performs a task of wiping the pre-processing liquid. When the wiping is performed, the wiped pre-processing liquid drips from the wiper blade 821 along the second holder 823 (see FIG. 10). The dripping pre-processing liquid is received by the pre-processing liquid container 72.

FIG. 15A illustrates an example in which the pre-processing liquid container 72 including the second opening 72H having a front-rear width covering the actual wiping range d1 and a thickness of the pre-processing liquid wiper 83 before and after the actual wiping range d1 is disposed below the pre-processing head 5. When the second opening 72H is disposed in such a range, at least a region where the pre-processing liquid is most likely to drip can be covered, and thus the likelihood of the pre-processing liquid mixing into the ink container 71 can be significantly reduced.

Instead of the example illustrated in FIG. 15A, the second opening 72H may have a size equal to or slightly larger than the actual wiping range d1.

FIG. 15B illustrates a container area range d2 from a start position of the actual wiping of the pre-processing liquid wiper 83 until the pre-processing liquid wiper 83 exits the wiping area. The start position of the actual wiping is the upstream end of the nozzle array portion 51 as in FIG. 15A. The wiping area is a range covered by the first opening 71H of the ink container 71 in the present embodiment, and thus the position exiting the wiping area is the rear end edge of the first opening 71H. FIG. 15B illustrates an example in which the pre-processing liquid container 72A including the second opening 72H covering such a container area range d2 is disposed below the pre-processing head 5. When the second opening 72H is disposed corresponding to the container area range d2, the pre-processing liquid dripping from the pre-processing liquid wiper 83 during a period between completion of the actual wiping and while going toward the cleaning area can be collected by the pre-processing liquid container 72A.

FIG. 15C illustrates an entire range d3 of the predetermined movement path MW (FIG. 13) in which the pre-processing liquid wiper 83 moves when executing wiping. A rear end of the movement path MW is the standby position and an operation completion position of the pre-processing liquid wiper 83. A front end of the movement path MW is a position where the pre-processing liquid wiper 83 moves most forward in a series of the wiping operations. That is, during the wiping operation, the pre-processing liquid wiper 83 advances and moves from the rear end to the front end of the movement path MW, and returns from the front end to the rear end of the movement path MW after the carriage 3 descends and the nozzle array surface NA reaches a predetermined wiping height. Here, an example is illustrated in which the front end of the movement path MW is on the front side of the pre-processing head 5, but the front end of the movement path MW may be between the front end edge of the pre-processing head 5 and the upstream end of the nozzle array portion 51.

In FIG. 15C, an example is illustrated in which a pre-processing liquid container 72B including the second opening 72H covering the entire range d3 is disposed below the pre-processing head 5. In this case, the entirety of the movement path MW is set to the position without a region directly above the first opening 71H. When the second opening 72H is disposed corresponding to such a range d3, the pre-processing liquid can be more reliably collected by the pre-processing liquid container 72B. The pre-processing liquid container 72B includes a partition plate 725 at a boundary position between the wiping area and the cleaning area. A rear portion of the pre-processing liquid container 72B enters the cleaning area. By providing the partition plate 725, the pre-processing liquid collected in the wiping area can be isolated and collected through an independent path.

Removal Portion of Ink Wiper

Among the plurality of ink wipers 82 included in the wiping unit 8, the ink wiper 82A2 (FIG. 9) disposed for the downstream-side head 4A2 located on the leftmost side passes over the second opening 72H of the pre-processing liquid container 72 when the wiping unit 8 moves toward the cleaning area. When passing, the ink adhering to the ink wiper 82A2 may drip into the pre-processing liquid container 72 and cause aggregation or the like. Examples of how to deal with this problem are illustrated in FIG. 16A and FIG. 16B.

FIG. 16A is a schematic side view illustrating the periphery of the ink wiper 82A2. The wiper blade 821 of the ink wiper 82A2 is supported by the protruding portion 813 of the wiper support plate 81 while being held by the first holder 822 and the second holder 823. When the ink wiper 82A2 wipes the downstream-side head 4A2 of the first ink head 4A, the wiped ink or the like may remain as adhering matter T in a state where the wiped ink does not completely fall from the lower end of the ink wiper 82A2. A sponge 77 (removal portion) is desirably disposed in order to reduce the adhering matter T before the second opening 72H of the pre-processing liquid container 72.

FIG. 16B is a main portion perspective view of the container unit 70 illustrating an arrangement of the sponge 77. In the present embodiment, in the movement direction of the ink wiper 82A2 to the cleaning area, the second opening 72H is disposed on the downstream side of the first opening 71H. The sponge 77 is disposed at a height position at which the sponge 77 comes into contact with the lower end surface of the ink wiper 82A2 and on the upstream side of the second opening 72H. A support plate 78 is provided to protrude near the upper end of the tapered surface 712 on the left side of the ink container 71 and on the upstream side of the second opening 72H. The lower end of the sponge 77 is fixed to the upper surface of the support plate 78. The adhering matter T containing the ink is removed by the sponge 77 before the ink wiper 82A2 reaches the second opening 72H. Thus, the ink can be suppressed from mixing into the pre-processing liquid container 72.

Inclined Arrangement of Wiper

Next, a preferred arrangement example of the ink wipers 82 and the pre-processing liquid wiper 83 will be described. FIG. 17 is a plan view illustrating an inclined arrangement of the ink wipers 82 and the pre-processing liquid wiper 83. As illustrated in FIG. 10, the ink wipers 82 includes a wiper blade 821A (ink blade) extending in a direction (left-right direction) intersecting the movement direction (front-rear direction) during wiping. Similarly, the pre-processing liquid wiper 83 also includes a wiper blade 821B (processing liquid blade) extending in the left-right direction.

In the movement direction of the ink wiper 82 during wiping, the wiper blade 821A of the ink wiper 82 is disposed to be inclined such that a left end portion side of the wiper blade 821A protrudes compared to a right end portion side. Attention is paid to the ink wiper 82A1 wiping the upstream-side head 4A1 of the first ink head 4A located on the right of the pre-processing head 5. As also illustrated in FIG. 18C, the wiper blade 821A of the ink wiper 82A1 is disposed to be inclined such that a left end portion 82L (first end portion) on a side where the processing liquid container 72 is present protrudes in the movement direction compared to a right end portion 82R (second end portion) on the opposite side thereof. The post-processing liquid wipers 84A and 84B wiping the post-processing heads 6A and 6B, respectively, are also disposed to be inclined such that the left end portions protrude in the movement direction of the post-processing liquid wipers 84A and 84B compared to the right end portions.

On the other hand, in the movement direction of the pre-processing liquid wiper 83, the wiper blade 821B of the pre-processing liquid wiper 83 is disposed to be inclined such that the right end portion side protrudes compared to the left end portion side. Referring also to FIG. 18B, the wiper blade 821B of the pre-processing liquid wiper 83 is disposed to be inclined such that a right end portion 83R (third end portion) on a side where the first opening 71H of the ink container 71 is present on the right protrudes in the movement direction compared to a left end portion 83L (fourth end portion) on the opposite side thereof.

FIG. 18A is a view illustrating a wiping state of a head 40 by a wiper blade 8210 having no inclination. The liquid L adheres to the head 40. The wiper blade 8210 is disposed so as to extend in a direction orthogonal to the wiping direction. When wiping is performed by such a wiper blade 8210, the liquid L wiped from the head 40 drips from the right and left of the head 40 as indicated by arrows in the drawing. For example, when the wiper blade 8210 is applied to the pre-processing liquid wiper 83, the pre-processing liquid dripping from the right side of the pre-processing head 5 may mix into the ink container 71. In addition, when the wiper blade 8210 is applied to the upstream-side head 4A of the first ink head 4A1, the ink dripping from the left side of the upstream-side head 4A1 may mix into the pre-processing liquid container 72.

FIG. 18B is a view illustrating a wiping state of the pre-processing head 5 by the pre-processing liquid wiper 83 including the wiper blade 821B having an inclination. The wiper blade 821B has an inclination such that the right end portion 83R protrudes in the wiping direction. Thus, the pre-processing liquid L1 wiped from the pre-processing head 5 by the wiper blade 821B drips only from the left side of the pre-processing head 5. Thus, the likelihood of the pre-processing liquid L1 dripping into the first opening 71H of the ink container 71 adjacent to the right side of the second opening 72H of the pre-processing liquid container 72 can be reduced.

FIG. 18C is a view illustrating a wiping state of the ink head 4 (upstream-side head 4A1) by the ink wiper 82 including the wiper blade 821A having an inclination. The wiper blade 821A has an inclination such that the left end portion 82L protrudes in the wiping direction. Thus, an ink L2 wiped from the upstream-side head 4A1 by the wiper blade 821A drips only from the right side of the upstream-side head 4A1. Thus, the likelihood of the ink L2 dripping into the second opening 72H during wiping can be reduced.

According to the embodiment illustrated in FIGS. 17, 18B, and 18C, dripping destinations of the pre-processing liquid L1 and the ink L2 wiped by wiping can be controlled by the inclined arrangements of the wiper blades 821A and 821B, respectively. Thus, the likelihood of the pre-processing liquid L1 and the ink L2 being mixed with each other in the ink container 71 or the pre-processing liquid container 72 can be reduced. When the inclined arrangement of the wiper blades 821A and 821B can prevent the pre-processing liquid L1 and the ink L2 from being mixed with each other, a part or the entirety of the movement range of the pre-processing liquid wiper 83 during wiping may be set directly above the first opening 71H.

FIG. 19 is a plan view illustrating another example of the inclined arrangement of the wiper. In FIG. 19, six ink heads 4F11, 4F12, 4F13, 4F14, 4F15, and 4F16 disposed on the front side and six ink heads 4R11, 4R12, 4R13, 4R14, 4R15, and 4R16 disposed on the rear side are provided as the ink heads 4. One pre-processing head 5 is provided on the upstream side of the group of ink heads 4, and two post-processing heads 6A and 6B are provided on the downstream side. A container unit including an ink container 71A, a pre-processing liquid container 72A, and a post-processing liquid container 72B which are compartmented from each other is exemplified as a container unit 70G. Each compartment includes a waste liquid ejecting port 74A.

Ink wipers 82F1, 82F2, 82F3, 82F4, 82F5, and 82F6 for wiping are provided for the ink heads 4F11 to 4F16 on the front side, respectively. Ink wipers 82R1, 82R2, 82R3, 82R4, 82R5, and 82R6 for wiping are also provided for the ink heads 4R11 to 4R16 on the rear side, respectively. The pre-processing liquid wiper 83 is provided for the pre-processing head 5, and the post-processing liquid wipers 84A and 84B are provided for the post-processing heads 6A and 6B, respectively.

A first feature of the embodiment illustrated in FIG. 19 is that at a boundary between the ink container 71 and the pre-processing liquid container 72A and at a boundary between the ink container 71A and the post-processing liquid container 72B, the wipers are disposed to be inclined in a direction in which the liquids wiped by wipers, respectively, move away from each other. Specifically, in the movement direction (rearward direction) during wiping, at the boundary between the ink container 71 and the pre-processing liquid container 72A, the pre-processing liquid wiper 83 is disposed to be inclined such that the right end portion side protrudes compared to the left end portion side. On the other hand, the ink wipers 82F1 and 82R1 wiping the ink heads 4F11 and 4R11, respectively, are disposed to be inclined such that the left end portions protrude compared to the right end portions, respectively. This arrangement is the same as the example in FIG. 17, and the pre-processing liquid and the ink can be easily separated from each other and collected. That is, the pre-processing liquid can be released to the left side to be reliably collected in the pre-processing liquid container 72A, and the ink can be released to the right side to be made difficult to mix into the pre-processing liquid container 72A.

At the boundary between the ink container 71A and the post-processing liquid container 72B, the post-processing liquid wiper 84A is disposed to be inclined such that the left end portion side protrudes in the movement direction compared to the right end portion side. On the other hand, the ink wipers 82F6 and 82R6 wiping the ink heads 4F16 and 4R16, respectively, are disposed to be inclined such that the right end portions protrude in the movement direction compared to the left end portions, respectively. With this arrangement, the post-processing liquid and the ink can be easily separated from each other and collected. That is, the post-processing liquid can be released to the right side to be reliably collected in the post-processing liquid container 72B, and the ink can be released to the left side to be made difficult to mix into the post-processing liquid container 72B. Such an arrangement is effective in a case where the post-processing liquid and the ink react with each other to cause aggregation or the like.

A second feature of the embodiment illustrated in FIG. 19 is that in the ink wipers 82F1 to 82F6 and 82R1 to 82R6, pairs of adjacent ones of wipers include a pair inclined in a direction in which the wiped liquids move away from each other and a pair inclined in a direction in which the wiped liquids move closer to each other. For example, in a wiper row on the front side, if attention is paid to a pair of the ink wipers 82F2 and 82F3 and a pair of the ink wipers 82F4 and 82F5, it can be seen that the pairs are inclined in directions in which the wiped liquids move away from each other. In a wiper row on the rear side, a pair of the ink wipers 82R2 and 82R3 and a pair of the ink wipers 82R4 and 82R5 are pairs each inclined in a direction in which the wiped liquids move away from each other. By adopting such an arrangement, in a case of inks which are not desired to be mixed with each other, for example, inks which aggregate when mixed with each other, both inks can be separated from each other and collected. For example, by disposing a partition plate or the like in the ink container 71A at a position corresponding to a position between the pair of ink wipers 82F2 and 82F3, the inks wiped from the ink heads 4F12 and 4F13, respectively, can be separated from each other and collected.

On the other hand, in a wiper row on the front side, if attention is paid to a pair of the ink wipers 82F1 and 82F2, a pair of the ink wipers 82F3 and 82F4, and a pair of the ink wipers 82F5 and 82F6 it can be seen that the pairs are inclined in directions in which the wiped liquids move closer to each other. In a wiper row on the rear side, a pair of the ink wipers 82R1 and 82R2, a pair of the ink wipers 82R3 and 82R4, and a pair of the ink wipers 82R5 and 82R6 are pairs inclined in directions in which the wiped liquids move away from each other. When such an arrangement is adopted, the inks in which color mixing is allowed can be collected by a common container portion. Examples of the inks in which color mixing is allowed include cyan and light cyan, blue and cyan, green and cyan, and magenta and light magenta. In this way, the ink collection can be efficiently performed by selectively using the arrangement in which the pair of ink wipers wiping the ink heads ejecting the inks in which the color mixing is allowed are inclined in directions in which the wiped liquids move closer to each other, and the arrangement in which the pair of ink wipers for the inks in which the color mixing is not allowed are inclined in directions in which the wiped liquids move away from each other.

The invention claimed is:

1. An inkjet recording apparatus, comprising:

a treatment liquid head configured to eject treatment liquid;

an ink head configured to eject ink;

a treatment liquid wiper configured to wipe the treatment liquid head;

an ink wiper configured to wipe the ink head;

an ink container with a first opening, the first opening being configured to receive the ink; and a treatment liquid container with a second opening, the second opening being configured to receive the treatment liquid, wherein a movement range of the treatment liquid wiper at a time of wiping is set at a position without a region directly above the first opening, wherein the treatment liquid container is located at a position covering a part of an upper side of the first opening, and wherein the movement range of the treatment liquid wiper at the time of wiping is set at a position directly above the second opening.

2. The inkjet recording apparatus according to claim 1, wherein the first opening and the second opening are located in series in a direction along a movement direction of the treatment liquid wiper at the time of wiping, and wherein the movement direction of the treatment liquid wiper is set at a direction away from the first opening.

3. The inkjet recording apparatus according to claim 2, further comprising:

a cleaning area where the ink wiper is cleaned; and a removal portion configured to remove ink adhering to the ink wiper or a support member thereof, wherein in a movement direction of the ink wiper to the cleaning area, the second opening is located downstream of the first opening, and wherein the removal portion is located upstream of the second opening.

4. The inkjet recording apparatus according to claim 1, wherein the treatment liquid wiper is configured to move along a predetermined movement path when wiping is performed, and wherein an entirety of the movement path is set at a position without a region directly above the first opening.

5. The inkjet recording apparatus according to claim 1, further comprising a cleaning area where the treatment liquid wiper and the ink wiper are cleaned, wherein in a movement direction from an area where wiping is performed to the cleaning area, the treatment liquid wiper is located at a position closer to the cleaning area than the ink wiper.

6. The inkjet recording apparatus according to claim 1, further comprising, a cleaning area where the treatment liquid wiper is cleaned, wherein a movement direction of the treatment liquid wiper at the time of wiping is set at a direction in which the cleaning area is located.

7. The inkjet recording apparatus according to claim 1, further comprising a printing area where ink is ejected from the ink head to form an image, wherein in a movement direction from the printing area to an area where wiping is performed, the treatment liquid wiper is located at a position closer to the printing area than the ink wiper.

8. The inkjet recording apparatus according to claim 1, further comprising a support plate configured to support the treatment liquid wiper and the ink wiper, wherein in a shape of the support plate in a top view, a support region of the support plate, the support region being configured to support the treatment liquid wiper, protrudes in a movement direction at the time of wiping compared to other regions of the support plate.

9. The inkjet recording apparatus according to claim 1, further comprising a support plate configured to support the treatment liquid wiper and the ink wiper, wherein in a shape of the support plate in a top view, the support plate includes a plurality of protruding portions each corresponding to a respective one of the treatment liquid wiper and the ink wiper, and wherein the treatment liquid wiper and the ink wiper are located at a respective one of corresponding protruding portions.

10. The inkjet recording apparatus according to claim 1, further comprising a support plate configured to support the treatment liquid wiper and the ink wiper, wherein in a shape of the support plate in a top view, the support plate comprises a plurality of protruding plates protruding in a movement direction at the time of wiping and recessed portions each between the protruding plates, and wherein the treatment liquid wiper and the ink wiper are respectively located at an end edge of a protruding plate of the plurality of protruding plates or an end edge of a recessed portion of the recessed portions.

11. The inkjet recording apparatus according to claim 1, wherein the treatment liquid wiper and the ink wiper are different from each other in terms of shape or material.

12. The inkjet recording apparatus according to claim 1, wherein the ink wiper comprises an ink blade extending in a direction intersecting a movement direction at the time of wiping, and wherein the ink blade is located to be inclined, and a first end portion on a side where the treatment liquid container is present protrudes in the movement direction compared to a second end portion on the opposite side of the first end portion.

13. The inkjet recording apparatus according to claim 1, wherein the treatment liquid wiper comprises a treatment liquid blade extending in a direction intersecting a movement direction at the time of wiping, and the treatment liquid blade is located to be inclined, and a third end portion on a side where the ink container is present protrudes in the movement direction compared to a fourth end portion on the opposite side of the third end portion.

14. The inkjet recording apparatus according to claim 1, wherein the treatment liquid head and the ink head are located at a position where the treatment liquid head and the ink head entirely overlap each other in a movement direction at the time of wiping.

15. An inkjet recording apparatus, comprising:

a treatment liquid head configured to eject treatment liquid;

an ink head configured to eject ink;

a treatment liquid wiper configured to wipe the treatment liquid head;

an ink wiper configured to wipe the ink head;

an ink container with a first opening, the first opening being configured to receive the ink; and a cleaning area where the treatment liquid wiper and the ink wiper are cleaned, wherein a movement range of the treatment liquid wiper at a time of wiping is set at a position without a region directly above the first opening, and wherein in a movement direction from an area where wiping is performed to the cleaning area, the treatment liquid wiper is located at a position closer to the cleaning area than the ink wiper.

16. The inkjet recording apparatus according to claim 15, wherein the treatment liquid wiper is configured to move along a predetermined movement path when wiping is performed, and wherein an entirety of the movement path is set at a position without a region directly above the first opening.

17. An inkjet recording apparatus comprising:

a treatment liquid head configured to eject treatment liquid;

an ink head configured to eject ink;

a treatment liquid wiper configured to wipe the treatment liquid head;

an ink wiper configured to wipe the ink head;

an ink container with a first opening, the first opening being configured to receive the ink; and a printing area where ink is ejected from the ink head to form an image, wherein a movement range of the treatment liquid wiper at a time of wiping is set at a position without a region directly above the first opening, and wherein in a movement direction from the printing area to an area where wiping is performed, the treatment liquid wiper is located at a position closer to the printing area than the ink wiper.

18. The inkjet recording apparatus according to claim 17, wherein the treatment liquid wiper is configured to move along a predetermined movement path when the wiping is performed, and wherein an entirety of the movement path is set at a position without a region directly above the first opening.

19. The inkjet recording apparatus according to claim 17, further comprising a cleaning area where the treatment liquid wiper is cleaned, wherein a movement direction of the treatment liquid wiper at the time of wiping is set at a direction in which the cleaning area is located.

* * * * *